US010203701B2

(12) United States Patent
Kurdi et al.

(10) Patent No.: US 10,203,701 B2
(45) Date of Patent: Feb. 12, 2019

(54) DYNAMIC TASK ALLOCATION IN AN AUTONOMOUS MULTI-UAV MISSION

(71) Applicant: Massachusetts Institute of Technology, Cambridge, MA (US)

(72) Inventors: Heba Abdullatif Kurdi, Cambridge, MA (US); Jonathan Patrick How, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/344,014

(22) Filed: Nov. 4, 2016

(65) Prior Publication Data
US 2017/0131727 A1  May 11, 2017

Related U.S. Application Data

(60) Provisional application No. 62/252,034, filed on Nov. 6, 2015.

(51) Int. Cl.
*G05D 1/00* (2006.01)
*G05D 1/10* (2006.01)
*G06Q 10/06* (2012.01)

(52) U.S. Cl.
CPC .......... *G05D 1/104* (2013.01); *G05D 1/0027* (2013.01); *G06Q 10/06311* (2013.01)

(58) Field of Classification Search
None
See application file for complete search history.

(56) References Cited

U.S. PATENT DOCUMENTS

| 8,396,730 | B2 | 3/2013 | Khosla et al. |
| 8,634,982 | B2 | 1/2014 | Khosla et al. |
| 8,914,182 | B2 | 12/2014 | Casado et al. |
| 9,864,372 | B2 * | 1/2018 | Chen ................... G05D 1/0038 |
| 2013/0238170 | A1 * | 9/2013 | Klinger ................. G05D 1/104 |
| | | | 701/3 |
| 2014/0074339 | A1 | 3/2014 | Casado et al. |
| 2014/0249693 | A1 | 9/2014 | Stark et al. |
| 2014/0316616 | A1 | 10/2014 | Kugelmass |
| 2015/0234387 | A1 | 8/2015 | Mullan et al. |

(Continued)

OTHER PUBLICATIONS

International Search Report and Written Opinion for International Application No. PCT/US2016/060629 dated Jan. 31, 2017.

(Continued)

*Primary Examiner* — Rami Khatib
(74) *Attorney, Agent, or Firm* — McCarter & English, LLP; David R. Burns; John S. Curran

(57) ABSTRACT

A mechanism for dynamically allocating tasks among multiple UAVs operating autonomously during a mission is discussed. Task assignment is adjusted by each UAV dynamically during the mission based on criteria related to the individual UAV's operational status and/or mission parameters. Task allocation is determined independently without group communication between the UAVs actively taking part in the mission and without direct communication to a ground-based controller. A communication UAV provides a shared memory space that may be utilized by each UAV in determining its own task allocation.

26 Claims, 20 Drawing Sheets

(56) References Cited

U.S. PATENT DOCUMENTS

2015/0301529 A1* 10/2015 Pillai .................. B64C 39/024
                                                          701/2
2017/0083979 A1*  3/2017 Winn .................. G06Q 40/08

OTHER PUBLICATIONS

Badia et al., A collision avoidance model based on the Lobula giant movement detector (LGMD) neuron of the locust. IEEE International Joint Conference on Neural Networks. Jul. 25-29, 2004;3:1757-1761.

Chao et al., Autopilots for Small Fixed-Wing Unmanned Air Vehicles: A Survey. International Conference on Mechatronics and Automation. pp. 3144-3149, Aug. 5-8, 2007.

Chen et al., Locust Swarms—A new multi-optima search technique. IEEE Congress on Evolutionary Computation. pp. 1745-1752, May 18-21, 2009.

Chen et al., Optimization in Fractal and Fractures Landscapes Using Locust Swarms. ACAL 2009, LNAI 5865, pp. 232-241, (2009).

Collett et al., Spatial scales of desert locust gregarization. PNAS. Oct. 1998;95:13052-13055.

Duan et al., Bio-inspired Computation in Unmanned Aerial Vehicles. Springer-Verlag, Berlin. (2014).

Fischer et al., Relationships between body mass, motor output and flight variables during free flight of juvenile and mature adult locusts, Schistocerca gregaria. J Exp Biol. Sep. 2000;203(Pt 18):2723-35.

Gerkey et al., A formal analysis and taxonomy of task allocation in multi-robot systems. Intl J of Robotics Research. Sep. 2004;23(9):939-954.

How et al., Increasing autonomy of UAVs. Robotics & Automation Magazine, IEEE. 2009;16(2):43-51.

Morse et al., UAV video coverage quality maps and prioritized indexing for wilderness search and rescue. 5th ACM/IEEE International Conference on Human-Robot Interaction (HRI). pp. 227-234, Mar. 2-5, 2010.

Sword, Phenotypic plasticity and the evolution of warning coloration. Retrieved online at: https://web.archive.org/web/20140811000223/http://swrodlab.tamu.edu/Research/Plasticity/Plasticity.html. 3 pages (2012).

To et al., Radar Cross Section measurements of small Unmanned Air Vehicle Systems in non-cooperative field environments. 3rd European Conference on Antennas and Propagation. Mar. 23-27, 2009.

Wang et al., The locust genome provides insight into swarm formation and long-distance flight. Nature Communications. Jan. 14, 2014;5:1-9.

Yanmaz et al., A discrete stochastic process for coverage analysis of autonomous UAV networks. IEEE Globecom Workshops. Dec. 6-10, 2010.

Yue et al., Collision Detection in Complex Dynamic Scenes Using an LGMD-Based Visual Neural Network With Feature Enhancement. IEEE Transactions on Neural Networks. May 2006;17(3):705-716.

* cited by examiner

DYNAMIC TASK ALLOCATION IN AN AUTONOMOUS MULTI-UAV MISSION

CROSS-REFERENCE TO RELATED PATENT APPLICATION

This application claims priority to U.S. Provisional Application No. 62/252,034 filed on Nov. 6, 2015, the contents of the application are hereby incorporated by reference in their entirety.

BACKGROUND

Unmanned Aerial Vehicles (UAVs) are vehicles capable of flight with no pilot on board. UAVs are capable of performing in an autonomous or semi-autonomous fashion without direct control by a user and may perform a wide range of tasks that may be considered dull or dangerous for humans. For example, UAVs may be used to perform Search and Rescue in the case of man-made or natural disasters, search and track applications to identify individuals among crowds, search and fix applications in construction inspection missions and surveying and treating applications for crops. Similar non-flying unmanned vehicles can perform related applications in other operating environments such as unmanned submersibles performing inspections and/or repairs in an underwater environment.

BRIEF SUMMARY

When multiple UAVs are deployed on the same mission and are to operate autonomously without direct user control, the tasks to be performed during the mission must be properly allocated among the UAVs. Embodiments of the present invention provide a mechanism for dynamically allocating tasks among multiple UAVs operating autonomously during a mission. Task assignment is adjusted by each UAV dynamically during the mission based on criteria related to the individual UAV's operational status and/or mission parameters. Task allocation is determined independently without group communication between the UAVs actively taking part in the mission and without direct communication to a ground-based controller. A communication UAV provides a shared memory space that may be utilized by each UAV in determining its own task allocation.

In one embodiment a method for dynamically adjusting task allocation for a UAV during a multi-UAV mission without communication to a ground control station is provided. The method includes receiving at each UAV initial values for system variables based on the mission parameters and a first and second criteria associated with task allocation for the UAV. Each of the UAVs include a processor and communication interface. The method also includes determining, respectively within each of the UAVs, a first task to be executed by the UAV based on an initial comparison of the first criteria and a value related to a mission parameter or a physical characteristic of the UAV, executing, with each of the UAVs, the respectively determined first tasks, monitoring, individually within each of the UAVs, the value related to the mission parameter or the physical characteristic of the UAV. The method further includes comparing, individually within each of the UAVs, the value related to the mission parameter or the physical characteristic with the first criteria, detecting based on the comparing, that the first criteria is satisfied, determining a second task to be executed by at least one of the UAVs based on satisfaction of the first criteria, where the second task is different from the first task, and executing the determined second task with at least one of the UAVs.

In another embodiment, a non-transitory computer readable medium is provided that stores instructions executable by a processing device, the instructions implementing a method for dynamically adjusting task allocation for a UAV during a multi-UAV mission without communication to a ground control station. The instructions cause the UAV to receive initial values for system variables based on mission parameters for the multi-UAV mission and a first and second criteria associated with a task allocation for the UAV, determine within the UAV a first task to be executed based on an initial comparison of the first criteria and a value related to a mission parameter or a physical characteristic of the UAV, and execute, with the determined first tasks. The instructions further cause the UAV to monitor the value related to the mission parameter or the physical characteristic of the UAV, compare within the UAV the value related to the mission parameter or the physical characteristic with the first criteria, and detect that the first criteria is satisfied within the UAV based on the comparing. The instructions further causes the UAV to determine a second task based on satisfaction of the first criteria, where the second task is different from the first task, and execute the determined second task.

In yet another embodiment, a system is provided for dynamically adjusting task allocation for a UAV during a multi-UAV mission without communication to a ground control station. The system includes multiple UAVs to execute tasks, each of the UAVs having a processor and a communication interface, and a communication UAV having a processor, a communication interface, and a memory storing a geographic layout representation of a mission environment, each of the UAVs configured to separately communicate with the communication UAV to receive a status of the mission. Each of the UAVs is further configured to receive initial values for system variables based on mission parameters for the multi-UAV mission and a first and second criteria associated with a task allocation for the UAV, determine a first task to be executed by the UAV based on an initial comparison of the first criteria and a value related to a mission parameter or a physical characteristic of the UAV, and execute the respectively determined first tasks. Each of the UAVs further configured to monitor within each of the UAVs, the value related to the mission parameter or the physical characteristic of the UAV, compare within each of the UAVs, the value related to the mission parameter or the physical characteristic with the first criteria, and detect, in at least one of the UAVs, based on the comparing, that the first criteria is satisfied. The UAVs further configured to determine for the at least one of the plurality of UAVs, a second task to be executed by the at least one of the plurality of UAVs based on satisfaction of the first criteria, where the second task is different from the first task, and execute with the at least one of the UAVs the determined second task.

In another embodiment, a method for dynamically adjusting task allocation for a UAV during a multi-UAV mission without communication to a ground control station is provided. The method includes receiving at each UAV initial values for system variables based on the mission parameters and a first and second criteria associated with task allocation for the UAV. Each of the UAVs include a processor and communication interface. The method also includes determining, respectively within each of the UAVs, a first task to be executed by the UAV based on an initial comparison of the first criteria and the power level of the UAV, executing, with each of the UAVs, the respectively determined first tasks, monitoring, individually within each of the UAVs, the power level of the UAV. The method further includes comparing, individually within each of the UAVs, the power level of the UAV with the first criteria, detecting based on the comparing, that the first criteria is satisfied, determining a second task to be executed by at least one of the UAVs based on satisfaction of the first criteria, where the second task is different from the first task, and executing the determined second task with at least one of the UAVs.

In another embodiment a method for dynamically adjusting task allocation for an unmanned vehicle (UV) during a multi-UV mission without communication to a ground control station is provided. The method includes receiving at each UV initial values for system variables based on the mission parameters and a first and second criteria associated with task allocation for the UV. Each of the UVs include a processor and communication interface. The method also includes determining, respectively within each of the UVs, a first task to be executed by the UV based on an initial comparison of the first criteria and a value related to a mission parameter or a physical characteristic of the UV, executing, with each of the UVs, the respectively determined first tasks, monitoring, individually within each of the UVs, the value related to the mission parameter or the physical characteristic of the UV. The method further includes comparing, individually within each of the UVs, the value related to the mission parameter or the physical characteristic with the first criteria, detecting based on the comparing, that the first criteria is satisfied, determining a second task to be executed by at least one of the UVs based on satisfaction of the first criteria, where the second task is different from the first task, and executing the determined second task with at least one of the UVs.

BRIEF DESCRIPTION OF DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings.

DETAILED DESCRIPTION

Figure 1:
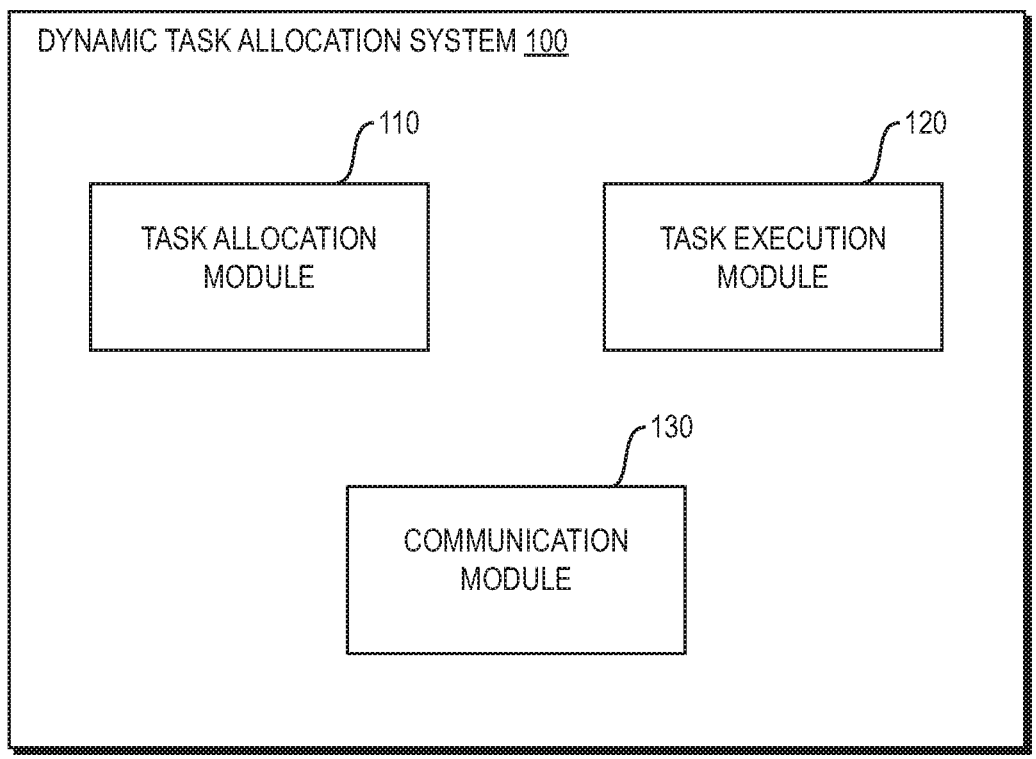
FIG. 1 is a block diagram showing a dynamic task allocation system implemented in modules, according to an example embodiment.

Embodiments of the present invention provide a mechanism for dynamically allocating tasks among autonomous UAVs during a multi-UAV mission. The task allocation occurs without communication between the UAVs taking part in the mission and a ground control station. Each UAV taking an operational part in the mission individually assesses and adjusts as necessary its own allocated task during the mission based on criteria related to the individual UAV's operational status and/or mission parameters. A communication UAV provides a shared memory space holding information related to the mission environment and other UAV locations. The shared memory space may be utilized by each UAV in determining its own task allocation.

UAVs are capable of performing tasks that may be considered dull or dangerous for humans. For example, in emergency situations, such as natural disasters, finding and rescuing potential survivors can be carried out by a group of UAVs. The UAVs cooperate with each other within a rescue environment that manned vehicles and humans cannot reach or have difficulty reaching. Since some UAVs are configured to operate autonomously without direct control, one of the challenges of multi-UAV missions is allocating tasks efficiently to the UAVs. This problem increases in complexity as the number of UAVS and the number of tasks increase. Task allocation in multi-UAV missions is further complicated by the operational nature of the UAVs which results in rapid change in distance between UAVs, topology and communication links. Conventionally this task allocation has traditionally been approached using variations of branch and bound algorithms or market-based algorithms. However, both approaches suffer from drawbacks. These type of algorithms often have large running times that increase based on the number of UAVs involved in the mission. The processing of such algorithms use up valuable UAV resources that could be used by the UAV for task execution rather than task allocation.

The traditional branch and bound approach is a general optimization approach that systematically enumerates candidate solutions. The full set of candidate solutions is at the root while solutions and the algorithm explores branches (solution) of the tree. This is usually done by checking against upper and lower estimated bounds on the optimal solution, for each branch. Branch and bound approaches have lengthy running times as they strive to enumerate all candidate solutions. As a result, the use of branch and bound algorithms consumes time and computation resources. The traditional market-based approaches address the task allocation problem by having each UAV auction for tasks, and by implementing a consensus approach for solving conflicts and determining the winning bid. However, such bidding-approaches also have lengthy running times as they require communication between all members for each task. Additionally, this type of approach also consumes communication and computation resources.

Embodiments of the present invention utilize multiple UAVs that present an intelligent collective behavior, albeit composed of simple parts (agents) of limited capabilities. This intelligent collective behavior emerges naturally from the special characteristics of these simple agents and includes: self-organization, adaptiveness and robustness. These properties lend themselves well to distributed optimization problems such as task allocation.

Described herein is an approach for task allocation in autonomous multi-UAV missions. One of its advantages is the complete absence of any form of direct communication during the mission between active UAVs in the field as instead of communicating with each other the mission UAVs communicate with a communication UAV that maintains a shared memory space holding mission information. Individual UAVs are responsible for their own decision making and task execution and employ an algorithm with a linear running time. The linear running time makes this approach very fast and more efficient in terms of consumed resources when compared to other traditional task allocation algorithms. Dynamic role allocation occurs individually within the UAVs which greatly increases the flexibility of the task allocation system by allowing swift adjusting of tasks based on situation awareness.

As noted above, multi-UAV missions may occur in many different operating environments. Although much of the discussion below refers to a Search and Rescue (SAR) mission, it should be appreciated that the discussion of task allocation in the context of SAR missions below is equally applicable to other operating environments. For ease of explanation, embodiments of the invention will first be described in functional terms and then in more specific terms of an SAR mission but these specific descriptions should be understood to have applicability beyond the specifically-described embodiments.

FIG. 1 is a block diagram 100 showing a dynamic task allocation system in terms of modules according to an example embodiment. The modules may be implemented in UAVs taking part in an autonomous multi-UAV mission such as the UAVs 910, 920, 930 shown in FIG. 9 taking part in an SAR mission to locate and rescue survivors. The modules include a task allocation module 110, a task execution module 120, and communication module 130. The modules may include various circuits, circuitry and one or more software components, programs, applications, apps or other units of code base or instructions configured to be executed by one or more processors included in UAVs 910, 920, 930. Although modules 110, 120, and 130 are shown as distinct modules in FIG. 1, it should be understood that modules 110, 120, and 130 may be implemented as fewer or more modules than illustrated.

The task allocation module 110 may be configured to receive initial values for system variables based on mission parameters at the beginning of the multi-UAV mission. The task allocation module may also determine a first task to be executed, monitor a value related to the mission parameter or the physical characteristic of the UAV, and determine a second task to be executed by the UAV. The task execution module 120 may be configured to cause the UAV to execute various tasks, for example, a first task such as performing a random search, a second task such as performing a guided search, or a third task such as assuming a standby status until called upon to rescue a survivor. The communication module 130 may be configured to enable communication between a UAV and a communication UAV. Further description of the task allocation module 110, task execution module 120 and communication module 130 in the context of an SAR mission is set forth below.

Figure 2:
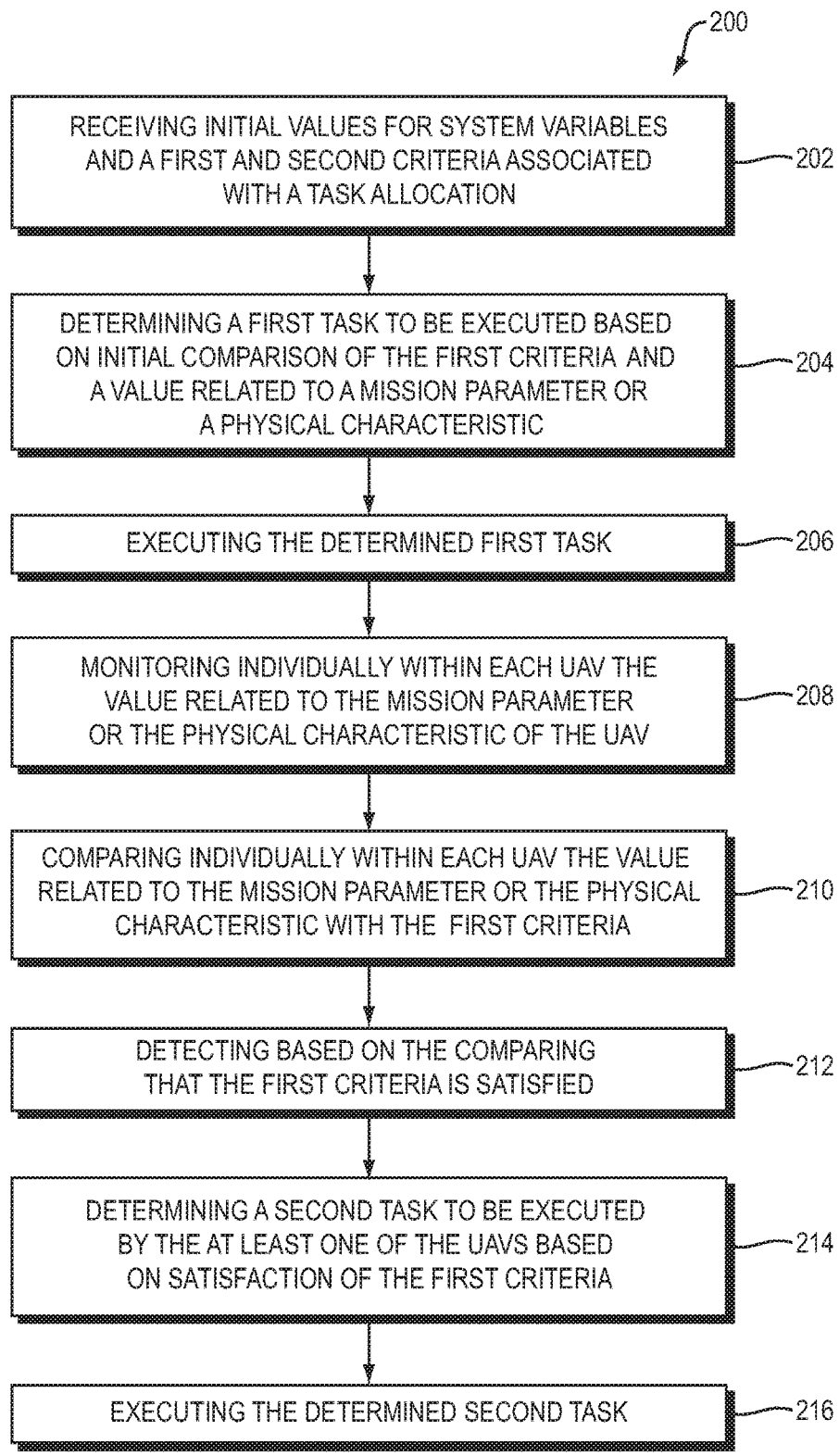
FIG. 2 is a flowchart showing an exemplary method for dynamically adjusting task allocation for an unmanned aerial vehicle, according to an example embodiment.

FIG. 2 is a flow chart showing an exemplary method 200 for dynamically adjusting task allocation for a UAV during an autonomous multi-UAV mission. The adjustment of the allocated task occurs without communication between the UAV whose task is being adjusted and a ground control station. The method 200 may be performed using the modules in the dynamic task allocation system 100 shown in FIG. 1. The exemplary method 200 begins with the task allocation module 110 on each UAV receiving initial values for system variables and a first and second criteria associated with a task allocation for the UAV at initialization time (step 202). The first and second criteria may be based on the mission parameters, and may include values related to the mission parameters and/or UAV physical characteristics. For example, the first and second criteria for an SAR mission or other search mission may include a mission elapsed time and/or a mission end time (expressed for example as an exact date and time, in day, month, hour, minute and second) or be related to a battery level of the UAV. The initial system variables may include a crowd tolerance level indicating an acceptable distance between two or more active UAVs. In one example the crowd tolerance level may be indicated as low, medium or high as defined with reference to a number of virtual blocks between UAVs in a virtual representation of the mission operating environment maintained by a communication UAV. The initial system variables may also include without limitation a speed of operation of the UAV (for example low, medium and high indicated in meters/hour), a distance of the UAV from the ground (e.g.: low, medium and high indicated in meters), a block size (for example defined in meter x meter), a value of a region size defined in terms of the number of blocks, a first criteria such as an 'eagle' power criteria (indicated for example in a percentage of battery of the UAV), a second criteria such as a 'standby' power criteria (indicated for example in a second lower percentage of battery of the UAV), and a number of communication UAVs in the mission. In some embodiments, the initial system variables and/or first and second criteria may be configurable or updated during a mission based on communications received from the communication UAV.

In an example embodiment, the first and second criteria indicate a threshold value that causes the UAV to transition to perform another task or a different task. For example, the first and second criteria may indicate that when a mission parameter is satisfied, the UAV changes task. In one embodiment, at a certain point in the elapsed mission time or when a region has been searched, a UAV may switch from performing a random search to only performing a guided search or to assuming a standby status to be available to perform rescues. As another example, the first and second criteria may indicate that when a value of a physical characteristic of the UAV is satisfied, the UAV changes task. For instance, an identified drop in battery level may also cause the UAV to change the type of search it is performing. Exemplary first criteria and the second criteria may be related to a mission time threshold, a mission area explored, a UAV power level threshold, a UAV battery level threshold, a UAV fuel level threshold, a sensor capability threshold (such as verifying a sensor's operational status to make sure the sensor has not been degraded by operating conditions, e.g.: sand abrasion in a desert environment), a UAV flying capability threshold (or a driving or swimming capability threshold, in the case of an unmanned vehicle operable on ground or in water), a UAV processing capability threshold, a UAV memory threshold, a UAV camera capability threshold, and the like. It will be appreciated that other criteria in addition to, or in combination with, the above-listed criteria are also within the scope of the present invention.

Continuing with the description of FIG. 2, after receiving the initial values for system variables, the task allocation module 110 determines a first task to be executed based on an initial comparison of the first criteria and a value related to a mission parameter or a physical characteristic of the UAV (step 204). The task allocation module 110 determines the first task individually within each UAV of the plurality of UAV in a multi-mission UAV. As such, the UAV does not need to communicate to a ground control station to determine its next task. In some embodiments, the value related to a mission parameter can be a mission end time, size of a mission region explored, or any combination thereof. In other embodiments, the value related to the mission parameter may be a value indicating crowd tolerance level, speed of operation of the UAV, distance from ground for the UAV, block/region size to be search or explored, number of communication UAVs involved in the mission, or any combination thereof. In some embodiments, the value related to the physical characteristic of the UAV is a power level of the UAV, a battery level of the UAV, a fuel level of the UAV, or any combination thereof. In some embodiments, the value related to a physical characteristic of the UAV indicates an operating stamina of the UAV. The operating stamina of the UAV may be based on the UAV's ability to operate or complete a task within a multi-UAV mission. The operating stamina of the UAV may be indicated in terms of power, battery or fuel available for the UAV to operate. The operating stamina of the UAV may also be indicated in terms of the capabilities or condition of the UAV sensors, UAV motors, UAV flying capabilities (driving or swimming capabilities in case of an unmanned vehicle operable on ground or in water), UAV communication interface, UAV processor, UAV memory, UAV camera, and the like.

After the first task is determined, the task execution module 120 causes the UAV to execute the first task by triggering execution of related instructions by the UAV's processor that are necessary to perform the first task (step 206). As a non-limiting example, the first task may be a scout task in which the UAV performs a scout role in a Search and Rescue mission as described in connection with example embodiments described in FIGS. 3-8. The task allocation module 110 in each individual UAV autonomously monitors the value related to the particular mission parameter or the physical characteristic of the individual UAV associated with the received first and second criteria (step 208). For example, the task allocation module 110 may continuously or periodically check the battery level of the UAV. The task allocation module 110 in each UAV compares within the UAV the value related to the mission parameter or the physical characteristic of the UAV with the first criteria (step 210). When the task allocation module 110 detects, based on the comparison, that the first criteria is satisfied (step 212), the task allocation module 110 determines a second and different task to be executed by the individual UAV based on satisfaction of the first criteria (step 214). For example, as noted above, a drop in battery level or the elapse of mission time may cause a UAV performing a Search and Rescue mission to transition from a random search in a region to a guided search in the region. As such, the UAV does not have any need to communicate to a ground control station to determine a change in its task but rather performs task allocation autonomously in a dynamic fashion in response to mission developments and/or UAV physical characteristics. Once the second task has been determined, the task execution module 120 causes the UAV to execute the second task by triggering execution of related instructions by the UAV's processor that are necessary to perform the second task. As a non-limiting example, the second task may be an eagle task in which the UAV performs an eagle role in a Search and Rescue mission as described in connection with example embodiments described in FIGS. 3-8. In some embodiments, determining the second task for the UAV includes adjusting the value of one or more of the initial values for system variables for the UAV based on the second task. For example, in a Search and Rescue mission, the initial values for system variables or operating characteristics of the UAV may be adjusted to reflect the change in role from a scout task to an eagle task. Example system variables or characteristics for the scout task and eagle task are shown in Table 1 below.

In some embodiments, the task allocation module 110 is further configured to compare within an individual UAV the value related to the mission parameter or the physical characteristic with the second criteria, and detect, based on the comparing, that the second criteria is satisfied. The task allocation module 110 is further configured to determine a third task to be executed by the UAV based on satisfaction of the second criteria, where the third task is different from the first task and the second task. For example, the third task may be for the UAV to assume a standby status to be available to perform an on-demand rescue instead of actively searching for survivors after a battery level deteriorates below a specified level. The task execution module 120 is further configured to execute the third task which is different from the first and second tasks.

In some embodiments, the UAV communicates with a communication UAV to receive a status of the mission and to access a shared memory space maintained by the communication UAV. The shared memory space stores a representation of the operating environment for the multi-UAV mission. The communication UAV may be a type of UAV that is similar to the type of the UAV that is executing mission tasks. In other embodiments, the communication UAV may be a different type of UAV than the UAVs executing mission tasks. For example, the communication UAV may have fewer operating capabilities. Communication UAVs serve as a form of associative memory where UAVs communicate asynchronously to build a virtual representation of the mission environment. For example, a mission UAV may check with the communication UAV to determine the location of other mission UAVs when forming its own determination of which block or region to search so as to comply with its system variables dictating minimum/allowed spacing between UAVs.

In example embodiments, the dynamic task allocation system of the present invention includes at least two communication UAVs, one of which serves as the main communication UAV while the other communication UAVs serve as backup for better fault tolerance. In another embodiment, the other communication UAVs in addition to the main communication UAV extend the communication range of the UAVs. It will be appreciated that the additional communication UAVs can perform both the backup and range extending roles. The number of communication UAVs may be determined by the size of the mission area and the type of communication technology supported by the multi-UAV mission and the UAVs. In the exemplary dynamic task allocation system described here, the role of a ground control station (for example device 970 described in connection with FIG. 9) is limited to sending the mission requirements and providing the initial values for system variables and first and second criteria for the multi-UAV mission as discussed above. In some embodiments, a detailed report about the mission outcome is transmitted by the communication UAV to the ground control station once the mission is completed, or periodically based on predetermined intervals.

Example Embodiment—Search and Rescue Mission

Figure 3:
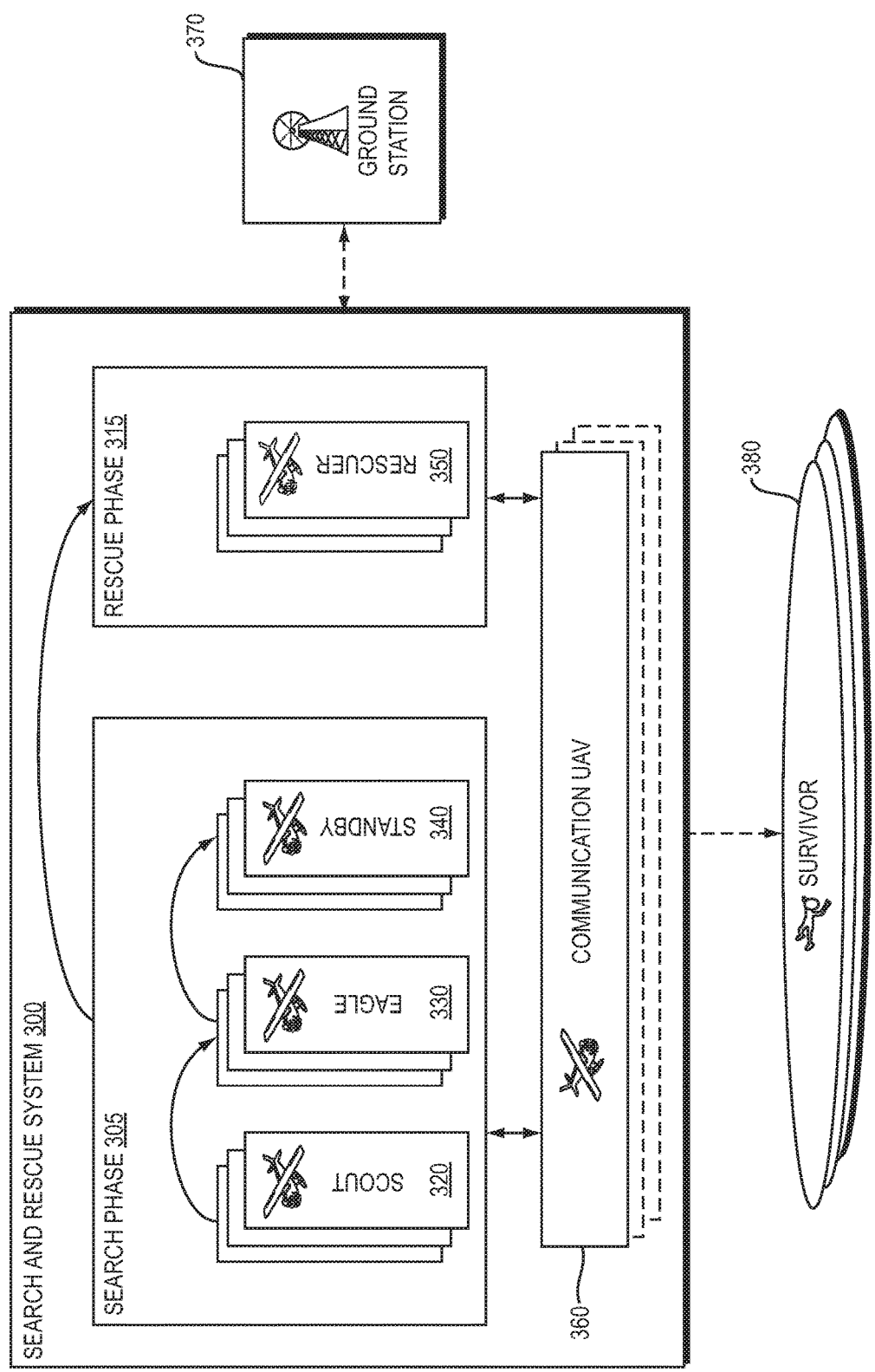
FIG. 3 is a block diagram showing an example search and rescue system using the dynamic task allocation system according to an example embodiment.

FIG. 3 is a block diagram showing an example search and rescue system 300 implemented using the dynamic task allocation system according to an example embodiment. In the search and rescue mission implemented using multiple UAVs, the process starts by allocating UAVs to search for survivors in a search environment. The task allocation approach described here allows UAVs to swiftly adapt to the change in priorities between tasks as mission time elapses and/or physical characteristics of the respective UAVs involved in the search change during the mission.

An example embodiment of a search and rescue mission is used for discussion purposes to illustrate an example implementation of the dynamic task allocation system described herein. As shown in FIG. 3, the example search and rescue mission system is divided into two phases: search phase 305 and rescue phase 315. The search phase 305 involves searching of the mission area, while the rescue phase 315 involves rescuing the survivors 380. The UAVs are divided into groups based on the tasks assigned to them. The UAVs may change tasks as discussed above. The UAVs may be grouped as scout UAVs 320, eagle UAVs 330, standby UAVs 340, and rescuer UAVs 350 which are described further below. The system 300 further includes one or more communication UAVs 360. The ground station 370 may communicate to the UAVs at the start of the mission to provide initial values for system variables and the first and second criteria. However, as discussed previously, the UAVs do not communicate with the ground control station during the mission and autonomously perform task allocation during the mission without outside control.

Figure 4A:
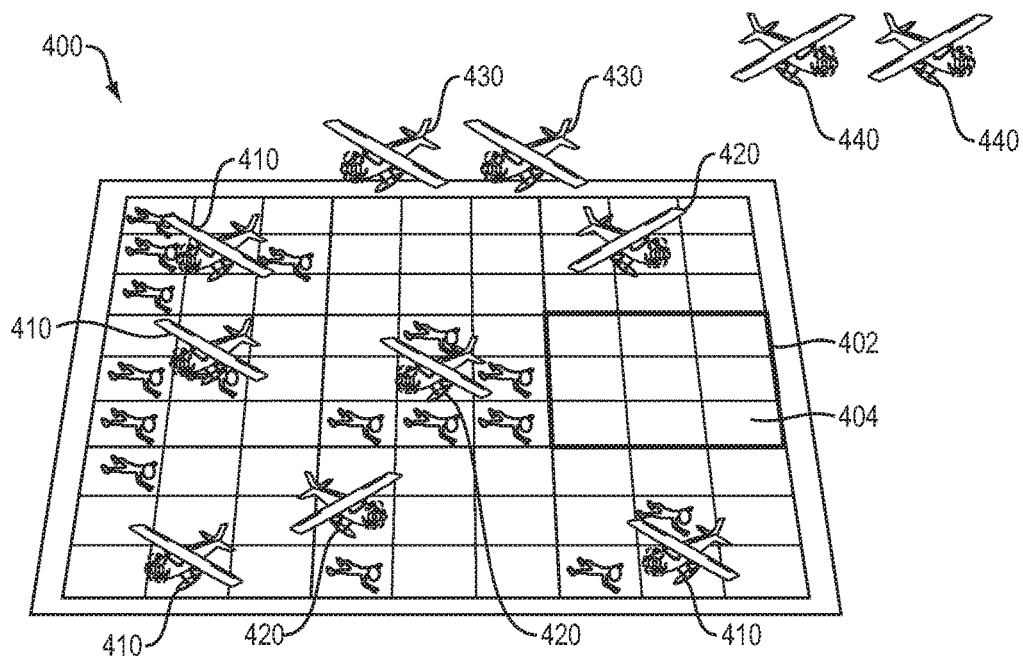
FIGS. 4A and 4B show a depiction of regions and blocks in a search and rescue mission using the dynamic task allocation system according to an example embodiment.
Figure 4B:
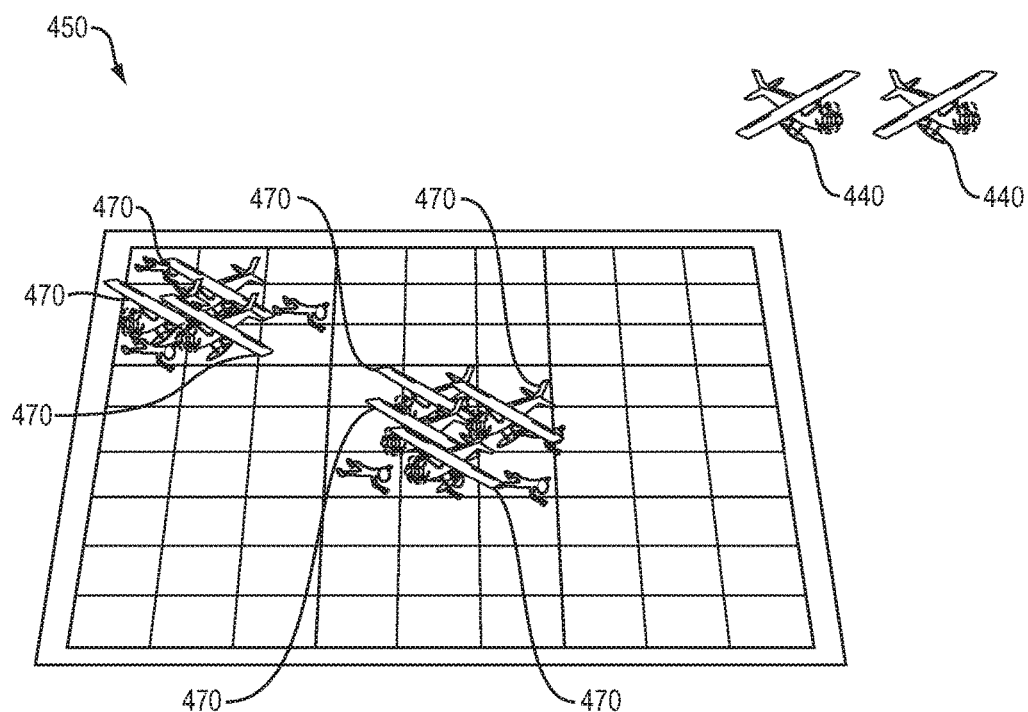

FIGS. 4A and 4B show a depiction of regions and blocks in a search and rescue mission using the dynamic task allocation system according to an example embodiment. The regions and blocks depicted in FIGS. 4A and 4B may correspond for example to information contained in the shared memory space maintained by a communication UAV. An area 400 of FIG. 4A may depict the mission area during the search phase. The area 450 of FIG. 4B may depict the mission area during the rescue phase. The search phase area 400 includes scout UAVs 410, eagle UAVs 420, standby UAVs 430, and communication UAVs 440. The tasks for the scout UAVs 410, eagle UAVs 420 and standby UAVs 430 are described below in connection with FIGS. 5-7. The rescue phase area 450 includes rescuer UAVs 470 and communication UAVs 440. The task for the rescuer UAVs 470 is described below in connection with FIG. 8. It will be appreciated that the information contained in the shared memory of the communication UAV will not ordinarily be stored as a visual depiction of the mission environment but that it is presented here in such a format to aid in explaining an embodiment of the present invention.

The mission area to be searched by the UAVs is divided into logical blocks in a shared memory space maintained by communication UAV 440. In one embodiment, each set of (3a×3a) blocks (shown by element 404 in FIG. 4A) is called a region (shown by element 402 in FIG. 4A), where a is a positive integer. The value of a is set during initialization based on the capabilities of the UAVs and the size of the mission area. The mission area may be represented as an in-memory table at the main communication UAV and the table may be frequently synchronized with the copies stored in the backup communication UAVs. In one embodiment, each region and each block can be in one of the following states: unassigned, assigned, explored, re-explore or re-explored. At initialization, all regions and blocks are in an 'unassigned' state. The state changes as the UAVs explore the regions and blocks. A region is considered 'explored' only when all of its blocks are explored, and it is considered 'assigned' when at least one of its blocks is in an assigned state. During the rescue phase, when all earlier-placed rescue requests to the communication UAV have been fulfilled, the status of all blocks with no discovered survivors is set to 're-explore' so that they can be subject to further extensive search. Rescue requests are discussed further below. Once a re-explore block's search is completed, its status is set to 're-explored'. In some embodiments, the size of the block is determined during initialization based on the dynamic task allocation system. Further, in some embodiments, the block size is determined based on the assumption that there is one survivor per block.

In the example embodiment, at initialization, UAVs are divided into two groups: searcher UAVs (which may include UAVs performing the tasks of scouts 410, eagles 420 and standbys 430), and communication UAVs 440. As the search phase begins, all searcher UAVs are tasked as scouts 410 exploring blocks for potential survivors. Scout UAVs 410 start with a full power level that decreases a certain amount after searching a block of a region. As the mission time elapses, any scout UAV 410 that has a power level less than or equal to a certain threshold changes its task to that of an eagle UAV 420. This change also occurs when there are no more unassigned regions to explore. As more power is lost, or there are no more unassigned blocks, the UAV task changes to that of a standby UAV 430. For the purpose of the mission, each potential survivor is assigned a 'life-time' and a location. The life-time decreases as the mission time passes. A survivor can be in one of four states: undiscovered, dead, discovered or rescued. At initialization, all survivors are considered 'undiscovered' and their states change accordingly as mission time elapses. An exemplary method for performing a scout task is described in connection with FIG. 5. An exemplary method for performing an eagle task is described in connection with FIG. 6. An exemplary method for performing a standby task is described in connection with FIG. 7. Table 1 illustrates exemplary differences in features and behaviors between the various searcher UAV tasks.

TABLE 1

Characteristics of UAVs during the search phase

| Characteristics | Scout | Eagle | Standby |
| --- | --- | --- | --- |
| Health | Excellent | Excellent to Medium | Excellent to Low |
| Strategy | Random search | Guided search | On demand rescue |
| Distance | Short | Medium | Short to Long |
| Speed | Low | Medium | High |
| Crowd Tolerance | Low | Medium | Not Applicable |

As the mission switches to the rescue phase, all searcher UAVs 410, 420, 430 switch their roles to rescuer UAVs 450 which are capable of flying at high speed for long distances to re-explore the regions for more potential survivors.

TABLE 2

Characteristics of Rescuer UAVs during the rescue phase

| Characteristic | Rescuer |
| --- | --- |
| Health | Excellent to Low |
| Strategy | Greedy Rescue |
| Distance | Short to Long |
| Speed | High |
| Crowd Tolerance | High |

In the example strategy referred to as a 'greedy rescue', the UAV selects the nearest region with the highest number of survivors by consulting the shared memory space of the communication UAV, and any found survivor in that region is rescued immediately.

In the search and rescue mission example, the dynamic task allocation system begins in the search phase. During the search phase, the search task is given the priority over the rescue task. During this search phase, UAVs steer away from each other to cover the most ground possible. This is implemented by having scout UAVs 410 search for survivors only in unassigned regions to ensure that no other UAVs are present in the same region. To determine unassigned regions, the UAV makes use of the information in the shared memory space maintained by the communication UAV that indicates which regions in the search environments have been assigned. For eagle UAVs 420 this is done by choosing unassigned blocks that are at mid-distance from other UAVs as defined at initialization by the initial values for system variables of crowd tolerance level for eagle UAVs. In one embodiment, only a standby UAV 430 is allowed to rescue in any block regardless of the distance from other UAVs.

As noted above, at the start of the search phase, all searcher UAVs are considered as scout UAVs 410. Scout UAVs 410 start with excellent health, that is, full power, and they follow a random search strategy with low speed for short distances. Initially, a scout UAV 410 performs a random search by randomly selecting any unassigned block in an unassigned region and starting to search for a survivor. This process is repeated until the block is explored or a survivor is found. Once found, the survivor is rescued by the scout although in certain defined circumstances the scout may transmit a rescue request to the communication UAV 440 for another UAV to perform the rescue. It should be appreciated that the term "rescue" as used herein may mean different things in different settings as a rescue may mean a physical removal of a survivor via the UAV, the delivery of medical or rescue supplies to the survivor, the directing of a human rescuer on the ground to the location of the survivor, the release of a flotation device into the water to rescue the survivor, or some other means of rendering aid to the survivor. After the rescue, the scout UAV 410 continues searching for more unassigned blocks in the region. After exploring all blocks in a region, if the UAV battery level has been designated as the first and/or second criteria for task allocation purposes and has deteriorated to the predefined eagle power threshold, the task allocation module in the UAV changes its task to eagle. Alternatively, if the battery level has reached the even lower standby battery level threshold, the UAV changes its task to standby. The objective of the standby task is to save the rest of the available power for rescue tasks which gain a higher priority as the mission time elapses. However, if all regions have been already assigned, the scout UAV 410 may change its task to eagle even if it has not reached the pre-defined eagle power threshold. The scout task may also terminate when the mission rescue point or the mission end time is reached. In some embodiments, the scout task may also terminate when there are no more unassigned regions. The mission end time is when the entire mission is over. The mission rescue point is the point in the mission when the system switches to the rescue phase. In an example embodiment, the mission rescue point may be the point in the mission when all regions have been explored. In another example embodiment, the mission rescue point is when the mission time reaches a predefined percentage of the entire mission time or a predefined point in mission time. If the rescue phase has not been started by the predefined mission rescue point, then the system switches to the rescue phase regardless of the remaining unexplored regions. For example, at initialization the mission rescue point may be predefined as 70% of the mission time or at 21 hours 15 minutes and 30 seconds. At this predefined mission rescue point, the system switches to the rescue phase.

Continuing with the discussion of the Search and Rescue embodiment, upon beginning performance of the eagle task, eagle UAVs 420 start with excellent health to medium health depending on how long they performed the scout task. The Eagle UAVs 420 follow a guided search strategy rather than the random search strategy employed by the scout UAVs 410. In the guided search, an eagle UAV 420 chooses to search for survivors in the nearest unassigned block that is in a distance greater than or equal to a predefined medium crowd tolerance distance. This allows the Eagle UAVs 420 to fly at a medium speed for medium distances and thus conserve some power. If the eagle UAV 420 finds a survivor, it transmits a rescue alarm to the communication UAV 440 to determine if there are any available standby UAVs 430 which may be available to perform a rescue. If a standby UAV 430 is available, it detects the registered rescue alarm and performs the rescue. In the meantime, the eagle UAV 420 explores other blocks for survivors with its remaining battery life. However, if no standby UAVs 430 are available, the eagle UAV 420 performs the rescue of survivor itself before continuing its search. After exploring each block, the eagle UAV 420 checks its power level if power level is the task allocation criteria it received at initialization. If the power level has reached the standby power threshold or if no more unassigned blocks exist, the task allocation module on the eagle UAV 420 changes it task to that of a standby UAV 430. The eagle task for the UAV may also terminate when the mission rescue point or the mission end time is reached. In some embodiments, the eagle task may also terminate when there are no more unassigned regions.

Standby UAVs 430 in this Search and Rescue embodiment start with excellent health to low health depending on the time spent on the eagle task. They are tasked to perform intermittent flights at a high speed for long distances. The standby UAVs 430 are not involved in the searching process, rather they are only available for on-demand rescue. In the standby task, the UAV may be in sleep mode and may land in the nearest convenient area for switching off most of its functionality. The standby UAV 430 periodically checks the communication space of the nearest communication UAV 440 to see if there are any pending rescue alarms. Once a request is detected, the standby UAV 430 responds by indicating availability in the virtual representation maintained by the communication UAV 440 and flies directly to the corresponding block indicated in the rescue alarm to rescue the survivor there. Once the rescue is completed, the standby UAV 430 may return to sleep mode and continue checking with the communication UAV 440 for any pending rescue alarms until all blocks are in an explored state. At this point, the task allocation module on the standby UAV 430 changes its task to rescuer. The standby task may also terminate when the mission rescue point or the mission end time is reached. In some embodiments, the standby task may also terminate when all of the blocks are in explored state. The communication UAV 440 maintains a dynamic list of UAVs performing the standby task to show the current standby UAVs 430 in the mission and their respective states (available or busy when rescuing).

The task allocation system of the present invention may switch to the rescue phase 315 when the mission reaches a predefined rescue time point or when all regions of the virtual representation of the mission environment maintained by the communication UAV have been explored. Upon detecting the predefined rescue time point or the fact that all regions have been explored, the task allocation module of each of the Searcher UAVs switch their task to Rescuers where rescue is given higher priority. The Rescuer behavior is guided by the number of survivors recorded in each region in the shared memory maintained by the communication UAV. The more survivors in a region, the more rescue UAVs 470 are recruited to the region. This strategy of concentrating rescuer UAVs 470 in certain regions is based on the observation that survivors tend to be in groups. This strategy may be effective even when the search area has an unknown layout such as occurs with an airplane crash or shipwreck, as well as when the search area has been completely distorted such as is found in severe earthquakes or floods.

In the rescuer task, rescuer UAVs 470 start with excellent health to low health depending on the time spent in rescuing while performing the standby task, and they are tasked to perform long flights at high speed. They start by responding to any pending rescue alarms placed during the search phase 305 of the mission. Once all search alarms are answered, the status of all blocks with no discovered survivors is set to re-explore in the memory map maintained by the communication UAV so that these blocks are subjected to a further search. In some embodiments, it is assumed that there is one survivor per block. Accordingly, for the blocks where a survivor was found, the system assumes that there are no more survivors in that block. However, for blocks where no survivors were found, the system sets these blocks for re-exploration to ensure that no survivor is left behind. It will be appreciated however, that in other embodiments the discovery of one survivor in a block triggers further searches of that block rather than the system assuming there are no additional survivors in the block.

During re-exploration, a rescuer UAV 470 selects the nearest region with the highest number of survivors and searches within the nearest re-explore status block in this region. Any found survivor is rescued immediately by the rescuer UAV 470 rather than registering a rescue alarm with the communication UAV as is done in the scout phase 305. The rescuer task continues until all blocks are re-explored or mission end time is reached.

Figure 5:
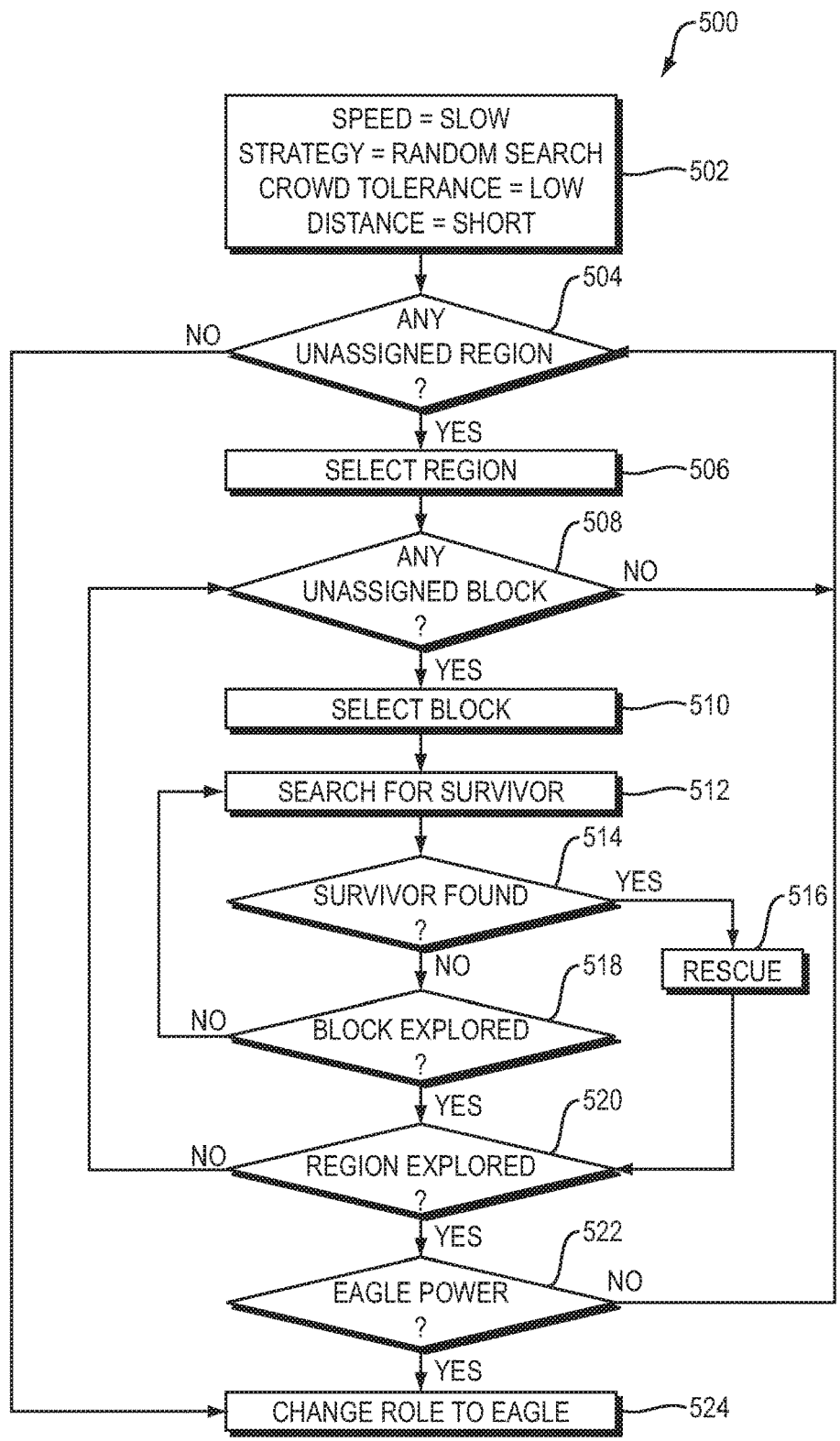
FIG. 5 is a flowchart showing an exemplary method for adjusting and executing a scout task in the dynamic task allocation system according to an example embodiment involving a search and rescue mission.

FIG. 5 is a flowchart showing an exemplary method 500 for adjusting and executing a scout task in the dynamic task allocation system according to an embodiment involving a search and rescue mission. The steps of method 500 may be implemented in one or more modules of the dynamic allocation task system 100 shown in FIG. 10. The steps of method 500 may be performed by UAVs 910, 920, 930 (described in connection with FIG. 9) individually, without communication with each other or the ground control station 970. At step 502, the values for system variables for the UAV are set as follows for a scout task: speed=slow; strategy=random search; crowd tolerance=low, distance=short. As described above, these values for system variables may be received by the UAV at initialization. At step 504, the UAV communicates with the communication UAV (for example communication UAV 940 described in connection with FIG. 9) to determine whether there are any unassigned regions in the mission, that is regions that have not been assigned to a UAV for searching. More specifically, the UAV receives the information from the shared memory space maintained by the communication UAV that provides a virtual representation of the operating environment divided into regions and blocks. If there are no unassigned regions, that is, all regions have been assigned, then the UAV adjusts to perform another task, for example, the eagle task, at step 524. If there is an unassigned region (i.e.: there is at least one region in the virtual representation to which a UAV is not noted to be assigned), then the method continues to step 506 and the UAV selects the unassigned region to perform the scout task.

Continuing with the discussion of FIG. 5, at step 510, the UAV selects an unassigned block in which to perform the scout task. The selections cause the virtual representation maintained by the communication UAV to update the status of the selected region and block. At step 512, the UAV searches the actual location represented by the selected block of the virtual representation of the mission environment for survivors. For example, the UAV may use various sensors coupled to the UAV to detect a presence of a survivor in the location represented by the block. At step 514, the UAV determines if a survivor is found. If yes, then the method proceeds to step 516, and the UAV rescues the survivor. After the rescue, the UAV determines at step 518 whether there is any more of the block to be explored. If the block is not done being explored, the method proceeds back to step 512 and the UAV continues to search for survivors in the block. If a survivor is not found or if the block is done being explored (step 518), then at step 520, the UAV communicates with the communication UAV to determine whether all of the selected region has been explored (i.e.: whether all blocks in the region have been searched). If the region has not been fully explored, then the method proceeds back to step 508, and the UAV continues to select and search any unassigned blocks from the region. If the region has been explored, then the method proceeds to step 522, where the UAV internally compares its power level to a predefined eagle power level. The eagle power level may be provided to the UAV with the initial values for system variables as the first or second criteria as described in connection with FIG. 2. If the UAV power level has diminished to be equal to or less than the predefined eagle power level, then the method proceeds to step 524, where the UAV changes its own task to eagle task. If the UAV power level is more than the predefined eagle power then the method proceeds back to step 504 and the UAV continues to perform the scout task.

Figure 6:
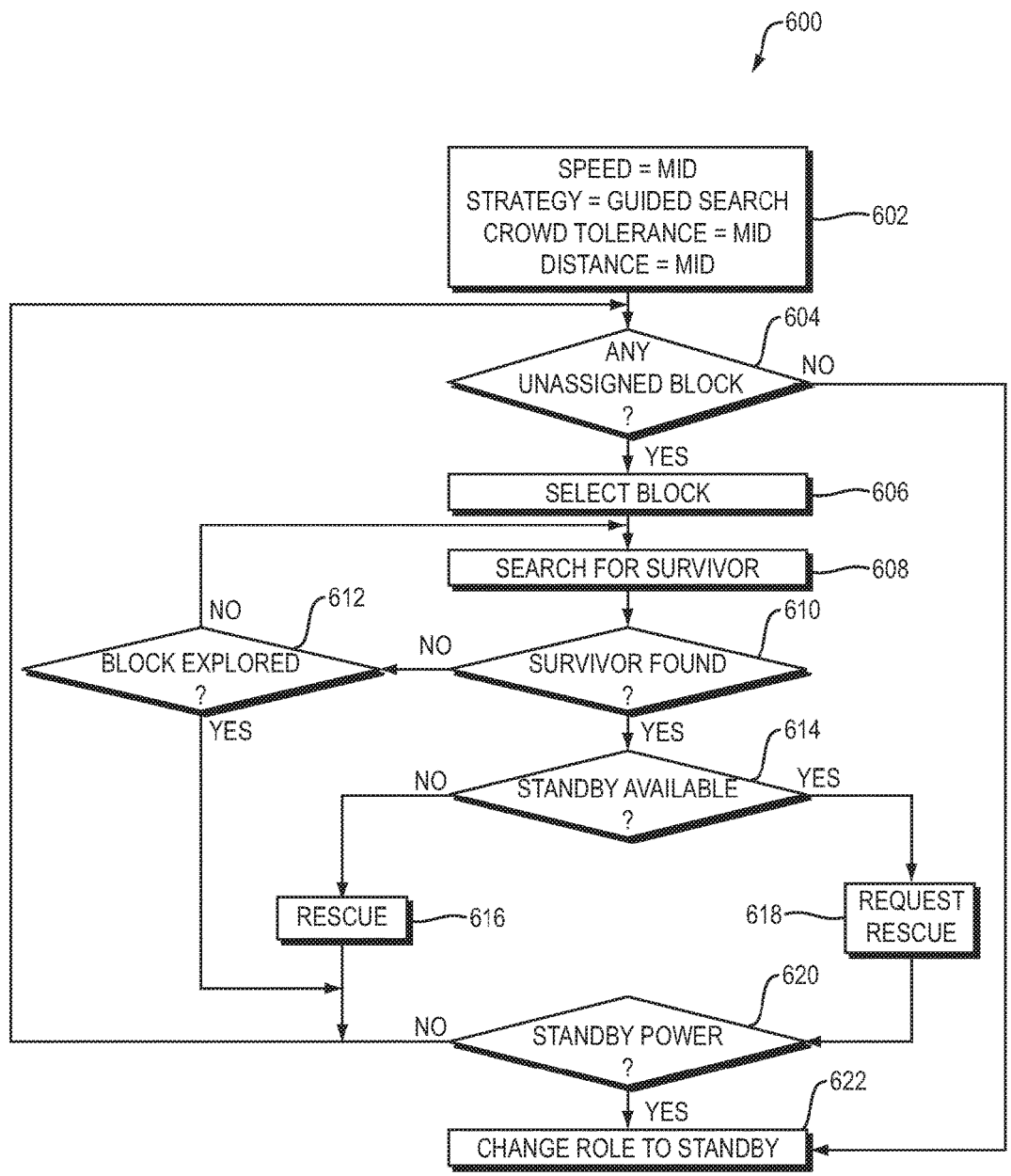
FIG. 6 is a flowchart showing an exemplary method for adjusting and executing an eagle task in the dynamic task allocation system according to an example embodiment involving a search and rescue mission.

FIG. 6 is a flowchart showing an exemplary method 600 for adjusting and executing an eagle task in the dynamic task allocation system according to an embodiment involving a search and rescue mission. The steps of method 600 may be implemented in one or more modules of the dynamic allocation task system 100 shown in FIG. 10. The steps of method 600 may be performed by UAVs 910, 920, 930 (described in connection with FIG. 9) individually, without communication with each other or the ground control station 970. At step 602, the values for system variables of the UAV are set to perform the eagle task as follows: speed=mid; strategy=guided search; crowd tolerance=mid; and distance=mid. As described above, these values of the system variables may be adjusted from the scout task by the UAV based on the determination that another task is to be executed. At step 604, the UAV communicates with the communication UAV (for example, communication UAV 940 described in connection with FIG. 9) to determine whether there are any unassigned blocks in the virtual representation of the mission environment that is being maintained in the shared memory space. If there are no unassigned blocks (that is, all the blocks within the region have been assigned for searching), then the method proceeds to step 622, and the UAV changes its task to standby. If there is an unassigned block, then the method continues to step 606 and the UAV selects the unassigned block to perform the eagle task. At step 608, the UAV searches the selected block for survivors. For example, the UAV may use various sensors coupled to the UAV to detect presence of a survivor in the block. At step 610, the UAV determines if a survivor is found. If a survivor is found, then the method proceeds to step 614. At step 614, the UAV communicates with the communication UAV to determine whether a standby UAV is available for rescue. This step is performed since an eagle UAV has more limited power than the scout UAV. A standby UAV may be any other UAV involved in the mission that is performing the standby task (described below in connection with FIG. 7). If a standby UAV is available, the eagle UAV registers a rescue alarm with the communication UAV. If a standby UAV is not available, then the eagle UAV rescues the survivor at step 616. After the rescue it is determined at step 612 whether the block has been fully explored. If the block is not explored, the method proceeds back to block 608 and the UAV continues to search for survivors in the block. Once the block has been fully explored or if no survivor is found, the UAV's task allocation module internally compares its power level to a predefined standby power level at step 620. The standby power level may be provided to the UAV with the initial values for system variables as the first or second criteria as described in connection with FIG. 2. If the UAV power level has diminished to, or is less than, the predefined standby power level, then the method proceeds to step 622, where the UAV changes it task to standby task. If the UAV power level is more than the predefined standby power then the method proceeds back to step 604 and the UAV continues to perform the eagle task.

Figure 7:
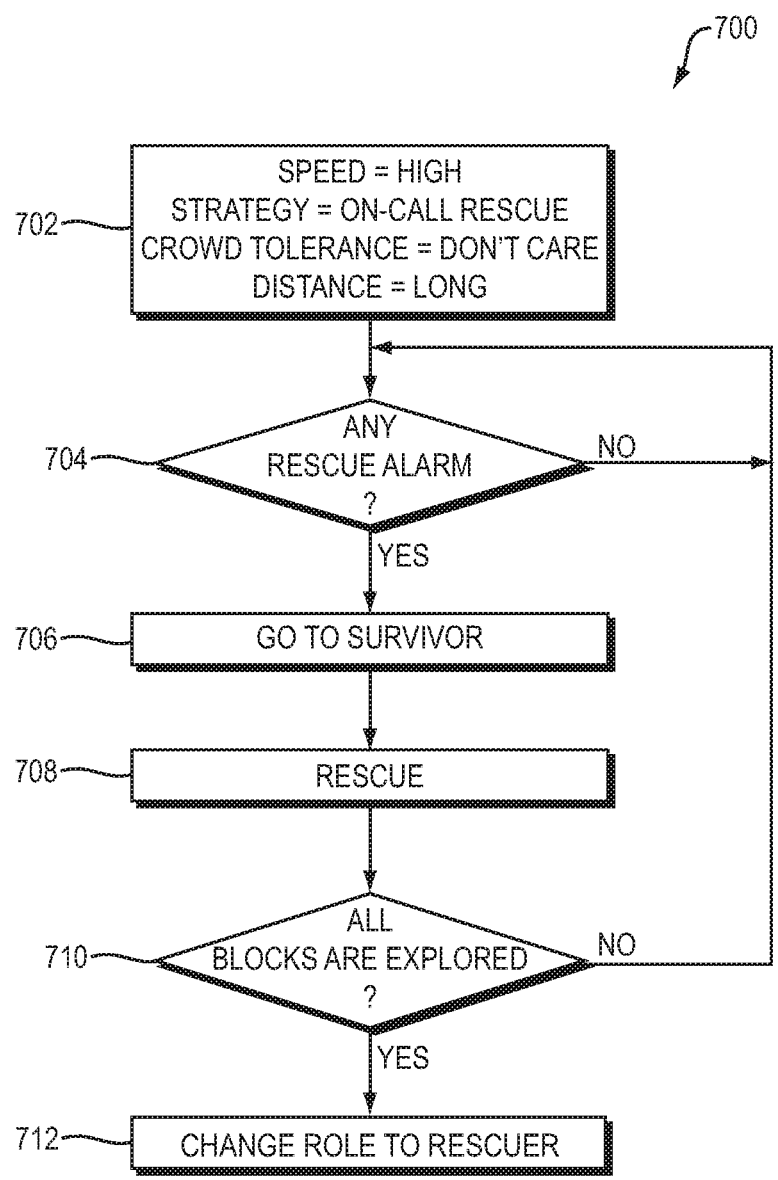
FIG. 7 is a flowchart showing an exemplary method for adjusting and executing a standby task in the dynamic task allocation system according to an example embodiment involving a search and rescue mission.

FIG. 7 is a flowchart showing an exemplary method 700 for adjusting and executing a standby task in the dynamic task allocation system according to an embodiment involving a search and rescue mission. The steps of method 700 may be implemented in one or more modules of the dynamic allocation task system 100 shown in FIG. 10. The steps of method 500 may be performed by UAVs 910, 920, 930 (described in connection with FIG. 9) individually, without communication with each other or the ground control station 970. At step 702, the variables of the UAV are set for the standby task as follows: speed=high; strategy=on-call rescue; crowd tolerance=not applicable; distance=long. As described above, these values for system variables may be adjusted from the scout task or the eagle task by the UAV based on the determination that another task is to be executed. At step 704, the standby UAV communicates with the communication UAV (for example, communication UAV 940 described in connection with FIG. 9) to determine if there are any pending rescue alarms. The rescue alarm may be registered by a UAV while performing the eagle task as described above in connection with FIG. 6. If there are no pending rescue requests, the method proceeds back to step 704 and the standby UAV continues perform the standby task. If there is a pending rescue request, then at step 706 the standby UAV flies to the block with the survivor, and rescues the survivor at step 708. After the rescue, the method continues to step 710, where the UAV communicates with the communication UAV to determine whether all blocks have been explored. If all blocks have not been explored, then the method goes back to step 704, and the standby UAV continues to perform the standby task. If all blocks have been explored, the method continues to step 712 and the standby UAV changes its task to rescuer.

Figure 8:
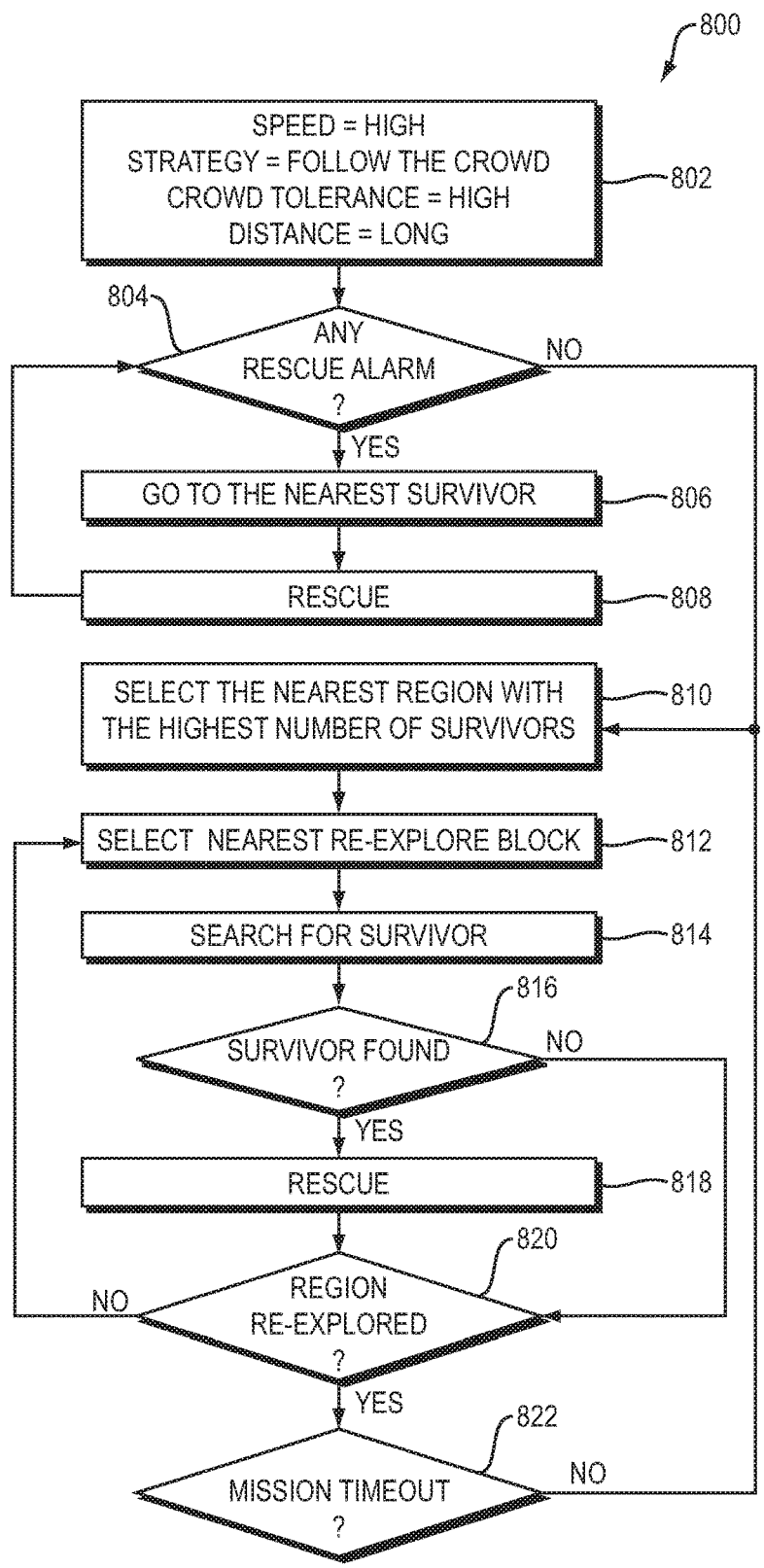
FIG. 8 is a flowchart showing an exemplary method for adjusting and executing a rescuer task in the dynamic task allocation system according to an example embodiment involving a search and rescue mission.

FIG. 8 is a flowchart showing an exemplary method 800 for adjusting and executing a rescuer task in the dynamic task allocation system according to an embodiment involving a search and rescue mission described here. The steps of method 800 may be implemented in one or more modules of the dynamic allocation task system 100 shown in FIG. 10. The steps of method 500 may be performed by UAVs 910, 920, 930 (described in connection with FIG. 9) individually, without communication with each other or the ground control station 970. At step 802, the values for system variables for the UAV are set to perform the rescuer task as follows: speed=high; strategy=follow the crowd; crowd tolerance=high; distance=long. As described above, these values may be adjusted from the standby task by the UAV based on the determination that another task is to be executed. At step 804, the rescuer UAV communicates with the communication UAV to determine if there are any pending rescue alarms. If there is at least one pending rescue alarm, the method continues to step 806, and the rescuer UAV flies to the nearest survivor as indicated in the rescue alarm. At step 808, the UAV rescues the survivor. The method then goes back to step 804, and the UAV continues to check for pending rescue alarms. It should be noted that the rescue UAV performs the rescue regardless of the presence of other nearby UAVs. If there are no pending rescue alarms, the method proceeds to step 810, where the UAV selects the nearest region with the highest number of survivors found in the region. At step 812, the UAV selects the nearest block within the region to re-explore to ensure that all survivors have been found. The region with a high number of survivors is re-explored for survivors based on the theory that survivors tend to be located near other survivors. At step 814, the UAV searches the selected block for survivors. For example, the UAV may use various sensors coupled to the UAV to detect presence of a survivor in the block. At step 816, the UAV determines if a survivor is found. If a survivor is not found, then the method proceeds to step 820. At step 820, it is determined whether the region has been re-explored. If the region has not been re-explored, the method goes back to step 812 and the UAV continues to re-explore the block for survivors.

If a survivor is found, then the method proceeds to step 818 where the UAV rescues the survivor. After the rescue, the method proceeds to step 820, where the UAV communicates with the communication UAV to determine whether the region has been re-explored by utilizing the virtual representation maintained in the shared memory space by the communication UAV. If the region has not been re-explored, then the UAV continues to re-explore the blocks within the region (step 812). If the region has been re-explored, then the UAV determines at step 822 if the mission end time has been reached. The mission end time may be provided to the UAV with initial values for system variables described in connection with FIG. 2 or may be determined by communicating with the communication UAV. If the mission end time has not been reached, then the method goes back to step 810.

In this manner, the systems and methods described herein dynamically adjust task allocation for a UAV during an autonomous multi-UAV mission without communication to a ground control station. The dynamic task allocation system allows a multi-UAV mission to operate efficiently and autonomously without back and forth communications to a ground control station. Rather, once the mission details are sent from the ground control station to the dynamic task allocation system at the outset of the mission, the system starts execution of the mission until mission end time is reached without further control from the ground. This is achieved by the UAVs individually determining when to change their respective tasks during the mission. Accordingly the system described herein provides high flexibility in task allocation based on situational awareness as well as a high degree of autonomy.

The dynamic task allocation system of the present invention implements an economic communication scheme where no communication is needed between the non-communication UAVs and required information can be accessed through the communication UAVs. Embodiments also provide enhanced security due to the absence of any direct communications between the active UAVs in the mission area as the only communication taking place is with the communication UAV. The system is also robust due to its distributed nature during task allocation and task execution with the result that the system can still have its full functionality even when some UAVs malfunction. Due to the linear running time of the task allocation approach, the system also offers faster execution time than traditional task allocation approaches. There is low computation overhead in terms of required processing cycles and runtime memories as the algorithms involve neither prediction nor analysis of any data item.

Even though an example embodiment is described as implementing a search and rescue mission, it should be understood that the dynamic task allocation system of the present invention can be implemented for a variety of different missions that require performance of different tasks. For example, a search and track mission can be implemented for searching a region or crowds for a particular target. In another example, a search and monitor mission can be implemented for searching a factory or warehouse environment to monitor goods in the region. As yet another example, an inspection mission can be implemented for searching regions for malfunctioning equipment and fixing machinery such power lines and pipelines. As yet another example, a survey and treat mission may be implemented for surveying fields and treating crops.

Additionally, although the description contained herein has focused on unmanned aerial vehicles or UAVs, it should be appreciated that non-flying machines are also within the scope of the present invention. More specifically, the task allocation system of the present invention may also be implemented using unmanned vehicles (UVs) that operate on ground, on water, under water, or on or in some combination thereof, instead of, or in addition to, exclusively using UAVs. Similarly, it should be appreciated that the multi-UAV missions described herein may also contain one or more UVs in addition to the UAVs without departing from the scope of the present invention.

Exemplary Network Environment and Devices

Figure 9:
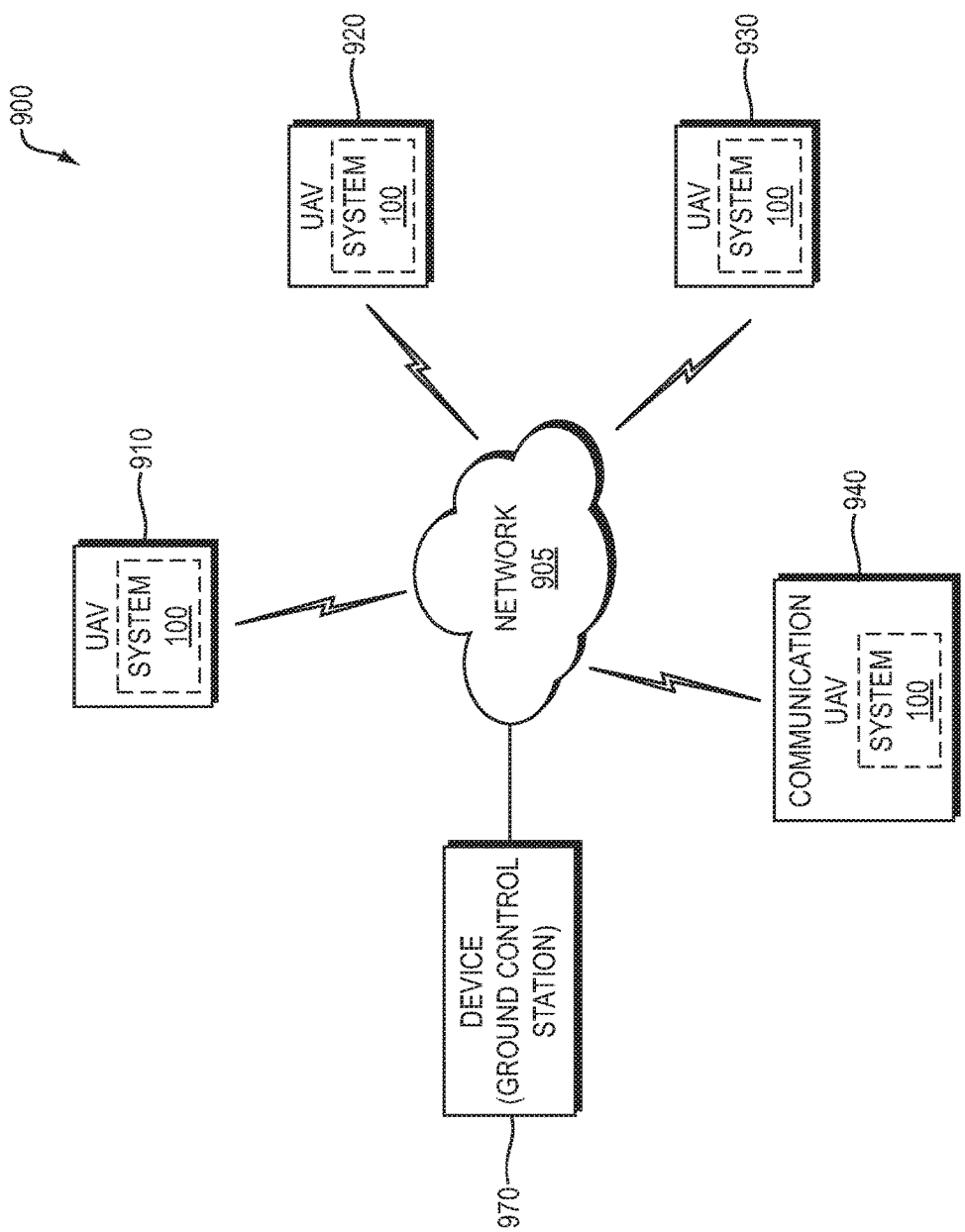
FIG. 9 illustrates an exemplary environment suitable for practicing an embodiment of the present invention.

FIG. 9 illustrates a network diagram depicting a system 900 for implementing the dynamic task allocation system, according to an example embodiment. The system 900 can include a network 905, multiple UAVs, for example, UAV 910, UAV 920, UAV 930, communication UAV 940 and device 970. Each of the UAVs 910, 920, 930, 940, and device 970 may be in communication with the network 905 via wireless or wired connections.

In an example embodiment, one or more portions of network 905 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The UAVs 910, 920, 930, 940 may be a drone or an aircraft without a human pilot, and may include a processor to execute instructions to operate the UAV and a communication interface to communicate to other UAVs and devices. The operation and flight of the UAVs 910, 920, 930, 940 is controlled autonomously by one or more processors included in each UAV. In some embodiments, the UAV includes external components to aid in completion of a mission. Each of UAVs 910, 920, 930, 940 may connect to network 905 via a wired or wireless connection. In exemplary embodiments, the UAVs 910, 920, 930, 940 may be any type of unmanned vehicle that is operated on ground, on water, under water, or in air. One or more modules of system 100 may be included in UAVs 910, 920, 930, 940. The UAVs 910, 920, 930, 940 may include one or more components described in connection with FIG. 10.

The device 970 may be part of a ground control station for the multi-UAV mission. The device 970 may comprise, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, smartphones, tablets, netbooks, and the like. The device 970 may connect to network 905 via a wired or wireless connection. The ground control station may provide initialization values for system variables to UAVs 910, 920, 930 and 940 via network 905 as described above at the outset of a mission.

Figure 10:
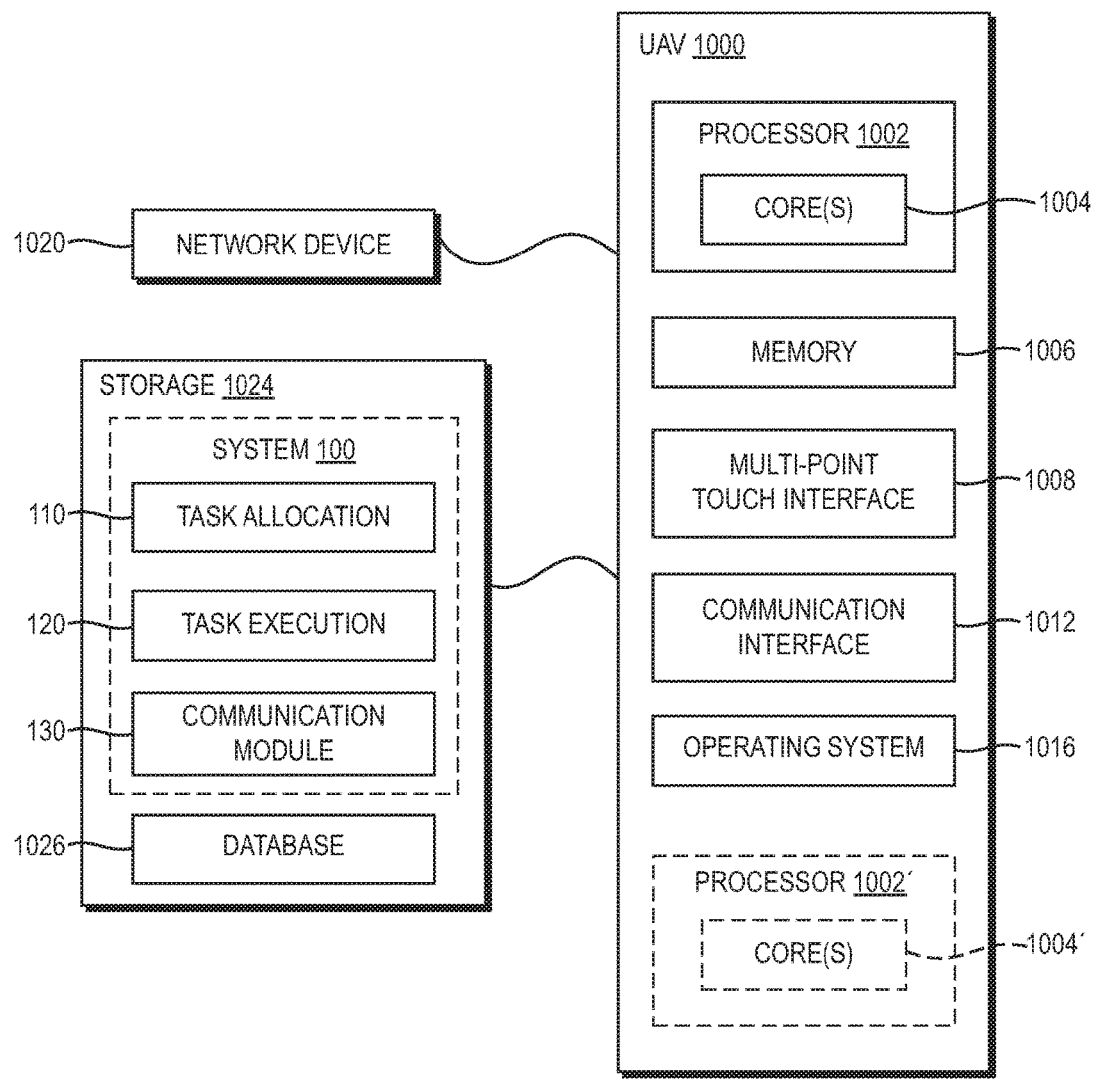
FIG. 10 is a block diagram of an exemplary UAV in an embodiment of the present invention.

FIG. 10 is a block diagram of an exemplary UAV 1000 that may be used to implement exemplary embodiments of the dynamic task allocation system 100 described herein. The UAV 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1006 included in the UAV 1000 may store computer-readable and computer-executable instructions or software for implementing exemplary embodiments of the dynamic task allocation system 100. The UAV 1000 may also include configurable and/or programmable processor 1002 and associated core 1004, and optionally, one or more additional configurable and/or programmable processor(s) 1002' and associated core(s) 1004' (for example, in the case of UAVs having multiple processors/cores), for executing computer-readable and computer-executable instructions or software stored in the memory 1006 and other programs for controlling UAV hardware. Processor 1002 and processor(s) 1002' may each be a single core processor or multiple core ( 1004 and 1004') processor. Memory 1006 may include a computer system memory or random access memory, such as DRAM, SRAM, EDO RAM, and the like. Memory 1006 may include other types of memory as well, or combinations thereof.

The UAV 1000 may also include one or more storage devices 1024, such as a hard-drive, CD-ROM, or other computer readable media, for storing data and computer-readable instructions and/or software that implement exemplary embodiments of the dynamic task allocation 100 described herein, including the task allocation module 110, task execution module 120, and communication module 130. Exemplary storage device 1024 may also store one or more databases for storing any suitable information required to implement exemplary embodiments. For example, exemplary storage device 1024 can store one or more databases 1026 for storing information, such as values for system variables, a first criteria, a second criteria, various other mission parameters, and/or any other information to be used by embodiments of the system 100. The databases may be updated manually or automatically at any suitable time to add, delete, and/or update one or more items in the databases.

The UAV 1000 can include a communication interface 1012 configured to interface via one or more network devices 1020 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the network interface 1012 may include a built-in network adapter, network interface card, PCMCIA network card, card bus network adapter, wireless network adapter, USB network adapter, modem or any other device suitable for interfacing the UAV 1000 to any type of network capable of communication and performing the operations described herein. Moreover, the UAV 1000 may be any computer system, or other form of computing or telecommunications device that is capable of communication and that has sufficient processor power and memory capacity to perform the operations described herein.

The UAV 1000 may run any operating system 1016, such as any versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1016 may be run in native mode or emulated mode. In an exemplary embodiment, the operating system 1016 may be run on one or more cloud machine instances.

Example Results from Analysis of System and Evaluation of Search and Rescue Embodiments Exemplary Evaluation Framework An evaluation framework has been used to analyze the task allocation system described herein. The evaluation framework includes a simulator built on the Java™ software platform based on a multi-UAV open source simulator (e.g., MASPlanes available at https://github.com/MASPlanes/MASPlanes) to allow a flexible control of parameters.

Two Search and Rescue mission issues were considered during an exemplary evaluation: scalability to a larger number of UAVs, and sustainability under large number of survivors. Therefore, two context parameters were controlled to simulate representative samples of Search and Rescue missions:

Number of UAVs: four different fleet scales were evaluated to illustrate the algorithm behavior—e.g., 4, 16, 32 and 64 UAVs.

Number of survivors: six different values for the number of survivors were evaluated—e.g., 16, 64, 256, 512, 1024, and 2048 survivors.

Three exemplary benchmark algorithms were employed to assess performance of the task allocation system. The three algorithms include an Opportunistic Task Allocation scheme, an Auction-based coordination, and a Max-Sum coordination. Hence, the total number of created scenarios is 4×4×6=96 scenarios (number of heuristics x number of values for number of UAVs×number of values for number of survivors). Each scenario is simulated five times to reduce variability in the performance measures.

The first of the benchmark algorithms is a simple Opportunistic Task Allocation strategy which commands the UAV to select a random block in the search area that has not already been explored. If a survivor is found upon arriving and searching the target block, the UAV that located the survivor immediately rescues the survivor, and only afterwards continues searching at random.

The second benchmark algorithm is an auction-based coordination strategy. This strategy instructs the UAVs to search blocks and report the survivor locations at the earliest upcoming auction event. The UAVs commence an auction process every few turns, the period of which is set by the initial configuration process. An auction event consists of every UAV sending out "auction" messages to all other UAVs including the list of survivors they have been assigned by an operator. Each UAV evaluates a cost function for each survivor it receives information about, as well as its own current tasks, and sends out in reply "bid" messages including the cost evaluated. Each survivor is then assigned to the lowest bidder by the auctioneer UAV which had the survivor assigned to them at the beginning of the auction. Once all winners are decided and survivors reassigned, the UAV proceeds to rescuing the survivor to which they have been re-assigned, and continues this task until the next auction, or until there no assigned survivors left to rescue. If no assigned survivors remain for the UAV to rescue, but there remains an unsearched block in the search space, then the UAV returns to searching the grid as per the specified search pattern until a new survivor is assigned to it via a subsequent auction event.

The last benchmark algorithm tested is a variation of the auction-based strategy, known as a max-sum coordination. The search phase is similar to the auction-based coordination strategy, but upon entering a rescue phase, the UAVs now also perform a specified amount of iterations of a non-greedy distribution algorithm that seeks to assign all of the survivors collectively via an optimal distribution amongst the UAVs by factoring in other costs such as battery capacity and survivor weight. Once the iterations of the max-sum coordination algorithm are run, the resulting allocation is then carried out by re-assigning each survivor if a new optimal UAV is found for rescuing said survivor. Just as before, the UAVs proceed to carry out their new survivor assignments until the next cycle of max-sum iterations, or until there are no other survivor assignments left. The UAV reverts to the search task if the search space has not been fully explored.

Data related to three performance metrics, net throughput, mean time to find and rescue a survivor, and total time needed to rescue all survivors, were measured for different scenarios. Extraneous variables, such as survivor life time (between 10-72 hours), survivor location and scattering is randomized to ensure representative samples in all evaluations. The survivor life time is randomized such that it is uniformly distributed across the critical window. The survivor locations is randomly generated using multivariate normal distributions so as to simulate hotspots of a specified radius where survivors are clustered together and are more likely to be found. To ensure repeatability of the testing process, the survivor life times and locations, and number of UAVs are generated and stored as test scenarios, for a total of 24 scenarios that may be reused for testing each benchmark algorithm described above. Upon starting the simulation, the initial locations of the UAVs and the their batteries states are randomly generated to introduce variability into the simulation.

Table 3 below illustrates exemplary parameter settings of the evaluation environment for performing the simulations described above.

TABLE 3

Parameter Settings of Evaluation Environment

| Parameter | | Settings |
|---|---|---|
| Plane Max Speed | | 40 miles/hour |
| Search Area Size | | 999 m × 999 m |
| | | 111 Regions × 111 Regions |
| | | 3 m × 3 m blocks |
| Hotspots | | 10 (Radius: 200 m, DOF: 2.5) |
| Charging Stations | | 9 |
| Survivor Critical Window | | 10-72 hours |
| Operator Strategy | | Nearest In-Range |
| Battery | Battery Capacity | 9000 units = 15 minutes of travel |
| | Battery Recharge Ratio | 30 units per second |
| Block Search | Power Consumption Penalty | 5 units of power |
| | Time Penalty | 10 seconds |
| Survivor Rescue | Power Consumption Penalty | 10 units of power |
| | Time Penalty | 60 seconds |
| Power Consumption | Idle | 1 unit of power per 300 milliseconds |
| | Standard | 1 unit of power per 100 milliseconds |

Evaluation Results

The simulations included a disaster area of 999 meters× 999 meters of 111 regions×111 regions, and 3 meters×3 meters blocks. The maximum UAV speed was 40 km/hour. The detailed selection of values for parameters are presented in Table 3 above. All simulations were run on the same hardware—a quad-core processor (e.g., Intel® Core™ i7-4790K Processor), overclocked to run at 4.6 GHz and paired with a 16 GB set of RAM operating at 1866 MHz.

Net Throughput

To measure the net throughput of the task allocation system, the total number of rescued survivors is measured by each benchmark algorithm described above then presented as a percentage of the total number of survivors in each scenario.

Figure 11A:
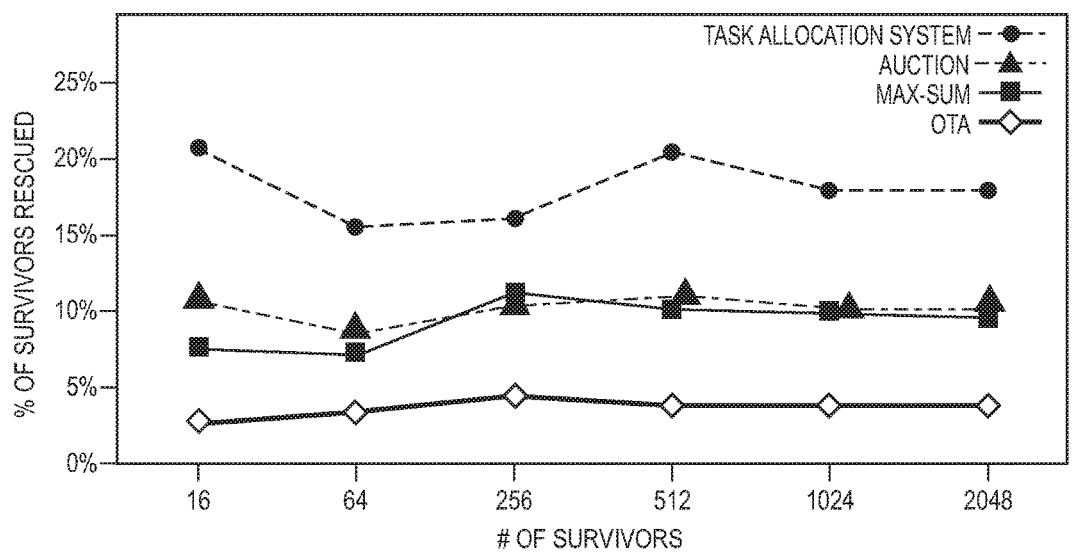
FIGS. 11A, 11B, 11C and 11D illustrate performance of the example task allocation system when compared to benchmark algorithms, in terms of the net throughput, according to example embodiments.
Figure 11B:
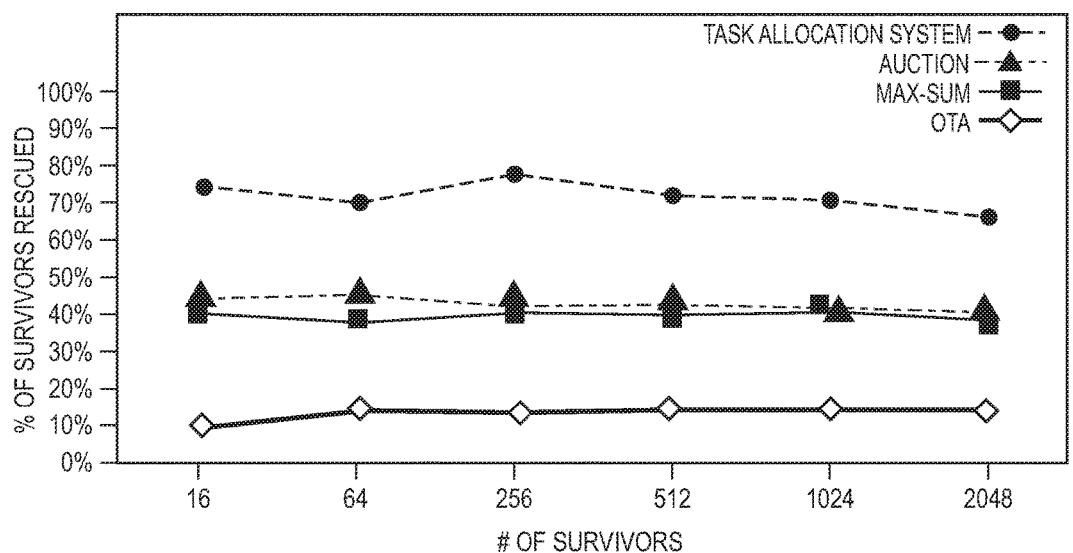
Figure 11C:
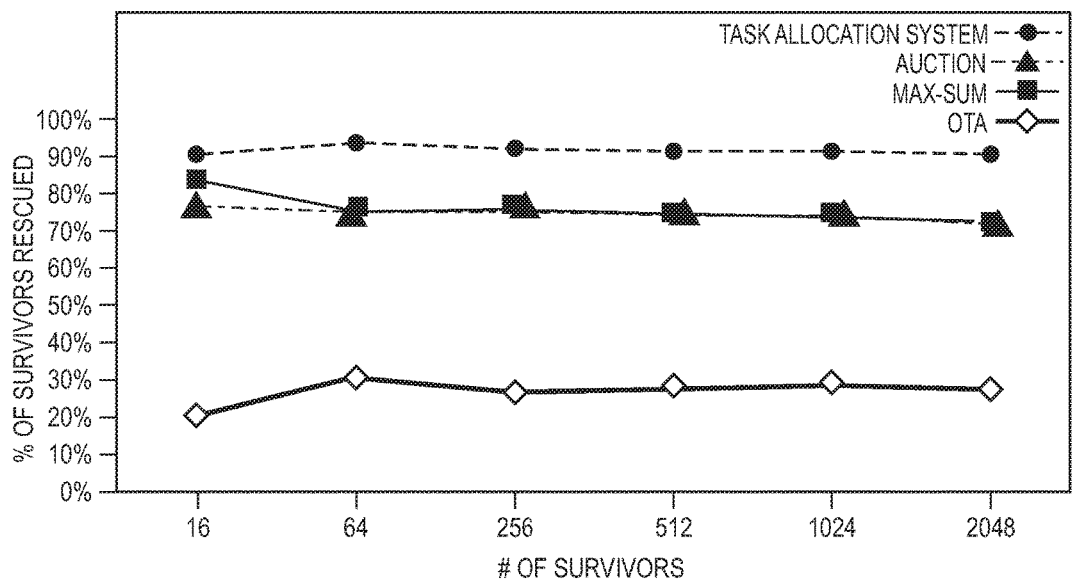
Figure 11D:
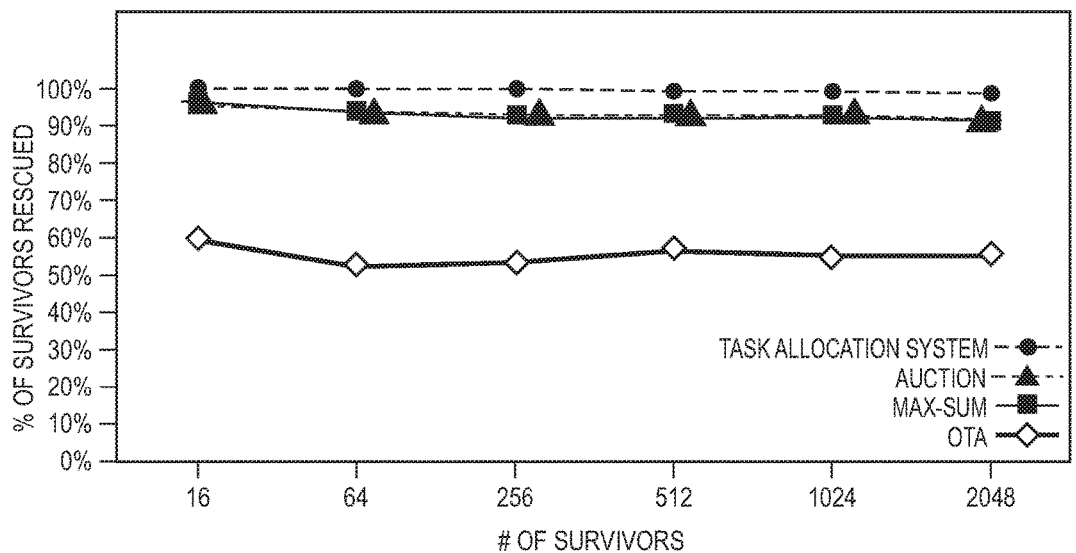

FIGS. 11A, 11B, 11C and 11D illustrate performance of the task allocation system described herein when compared to the benchmark algorithms, in terms of the net throughput (i.e. the percentage of rescued survivors), when the number of searcher UAVs varied. FIG. 11A illustrates the percentage of rescued survivors with 4 searcher UAVs. FIG. 11B illustrates the percentage of rescued survivors with 16 searcher UAVs. FIG. 11C illustrates the percentage of rescued survivors with 32 searcher UAVs. FIG. 11D illustrates the percentage of rescued survivors with 64 searcher UAVs. The results of the opportunistic task allocation algorithm is represented by the abbreviation OTA.

As shown in the figures, the task allocation system described herein significantly outperformed all the benchmark algorithms. The UAVs implementing the task allocation system at times achieved a mark of 100 percent rescued survivors. The smallest percentage of rescued survivors was still greater than fifteen percent for the task allocation system. The performance margins between task allocation system and the benchmarks only decreased for the simulations with 32 or 64 UAVs, because the task allocation system was already at or very near perfect performance scores and rescuing over 90% of the survivors. Hence, there was little room left for performance increases.

At least three observations can be made for the task allocation system outperforming the benchmark algorithms. First the task allocation system described herein is far more efficient at exploring the search grid. The task allocation system avoids unnecessarily assigning multiple UAVs to search blocks or regions that are immediately next to each other, at least until the majority of the blocks have been explored.

The second observation is that during the search phase, most survivors that were found were almost always immediately rescued. This is because the Scout UAVs were always instructed to immediately rescue any survivors they found, and the Eagle UAVs did so as well unless a Standby UAV was available. But even then, once a Standby UAV was assigned to a task, it was automatically flagged as "occupied" and therefore could not be overburdened with carrying out rescue tasks. This meant that most of the time, the UAVs would quickly switch between searching and rescuing survivors, with little to no interruption.

In addition, the "rescue phase" of the task allocation system is very efficient at locating survivors that may have gone undiscovered or unrescued in the search phase. This can also be attributed to the fact that the locations of each survivor were generated using multivariate normal distributions to create "hotspot" zones where survivors are more likely to appear such as in disaster scenarios where survivors gather at locations that provide critical supplies or shelter. People swarm together, and since the rescue phase of the task allocation system replicates this behavior, the task allocation system is more likely to find the nearby survivors that were clustered together.

Lastly, it is observed that the performance of the task allocation system, auction-based coordination, and max-sum coordination exhibited non-linear changes in response to increases in the number of survivors in the simulation, particularly when the number of searcher UAVs was small. An example of this is the sudden significant increase in the percentage of survivors rescued by 4 UAVs in the task allocation system, when simulating 512 survivors. This also occurs for scenarios with 4 max-sum or auction-based UAVs and 256 simulated survivors. One exemplary cause of these non-linear changes is that for small numbers of UAVs, there is a narrow range in which the number of survivors has reached an optimal saturation point across the search grid, leading to higher probability of a UAV finding a survivor in a block, while also not drastically increasing the rate of survivors deaths.

Mean Rescue Time

The rescue time is defined as the amount of time between the start of the simulation (when all survivors are created and placed in the simulation world), and the 'time step' upon which they are rescued by any UAV. To measure the mean rescue time of a survivor, the time step every time a survivor was rescued was recorded. Once the simulation ended, the average rescue time for the entire simulation was calculated.

It should be noted that for the first set of simulations, since survivors have a limited lifespan, they may cease to exist (die) before being found and/or rescued. As such, only the survivors rescued in the critical time window can contribute to the average rescue time.

Since each test scenario was repeated five times, each test resulted in a different number of rescued survivors. The data for the five repeated simulations was merged to calculate the weighted average using each simulation's average rescue time. The weights to calculate this statistic was the number of rescued survivors.

Figure 12A:
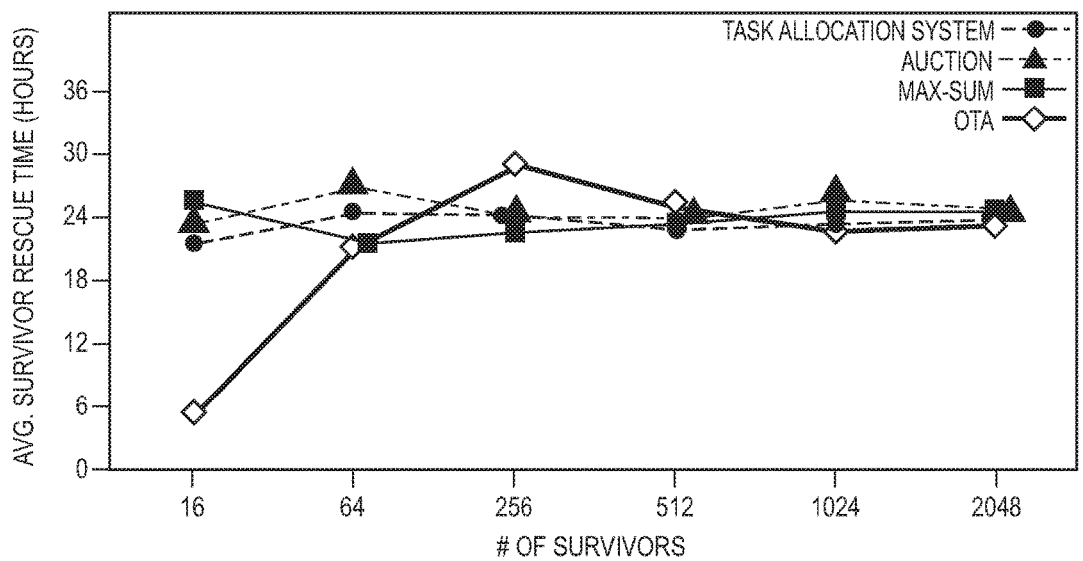
FIGS. 12A, 12B, 12C, and 12D illustrate performance of the example task allocation system when compared to benchmark algorithms, in terms of the mean rescue time, according to example embodiments.
Figure 12B:
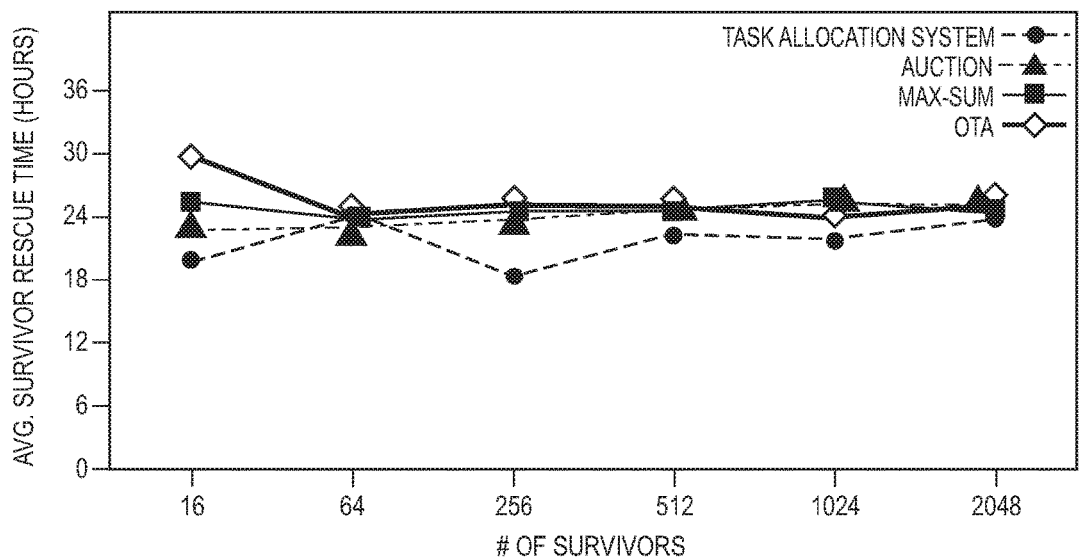
Figure 12C:
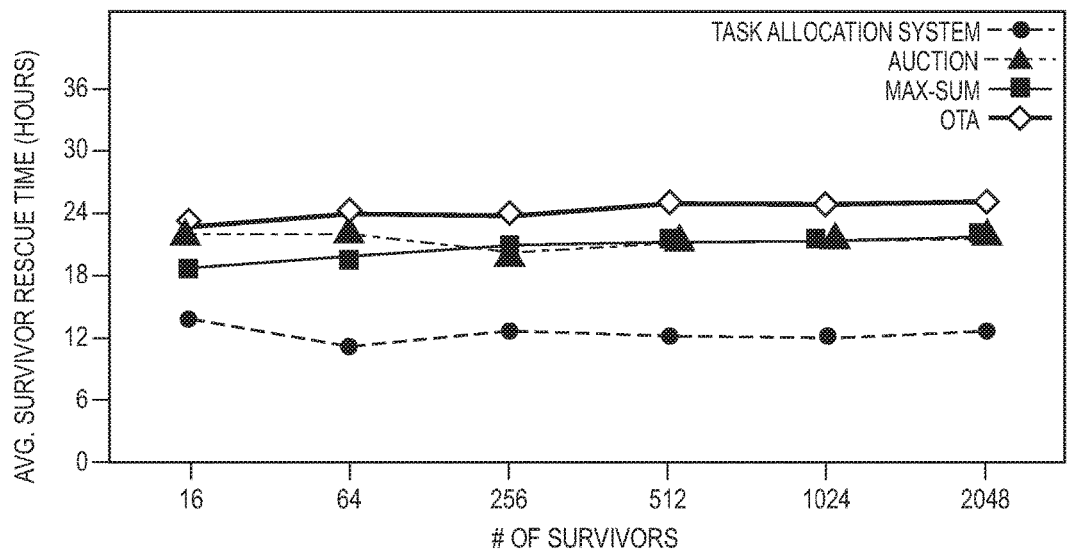
Figure 12D:
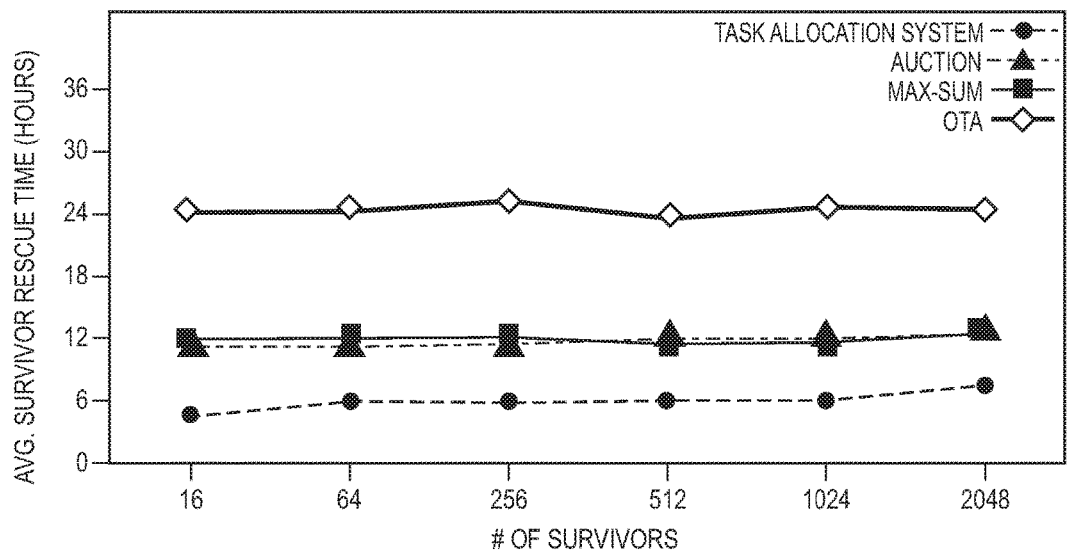

FIGS. 12A, 12B, 12C, and 12D illustrate the mean rescue time for varied numbers of UAVs. FIG. 12A illustrates the mean rescue time with 4 searcher UAVs. FIG. 12B illustrates the mean rescue time with 16 searcher UAVs. FIG. 12C illustrates the mean rescue time with 32 searcher UAVs. FIG. 12D illustrates the mean rescue time with 64 searcher UAVs. The results of the opportunistic task allocation algorithm is represented by the abbreviation OTA.

FIGS. 12A-12D illustrate that the task allocation system performs better once the number of UAVs increased significantly. All tests run with 4 or 16 UAVs showed little to no performance change over the auction-based coordination or max-sum coordination benchmark algorithms. However, it can be seen from FIGS. 11A and 11B that the UAVs in the task allocation system were on average rescuing more survivors than the benchmark algorithms, while still maintaining the same mean rescue time as the benchmark algorithms. As described above, the task allocation system outperforms other benchmarks algorithms in terms of mean rescue time as well because of its efficiency in searching for and quickly thereafter rescuing survivors that are clustered together.

It should be noted that while at first glance, it may appear as if the Opportunistic Task Allocation algorithm benchmark performed far better than all other algorithms for simulations with four UAVs and 16 survivors, the average number of survivors rescued under the Opportunistic Task Allocation algorithm as shown in FIG. 11A was less than 5%, and having to rescue fewer survivors requires far less time.

Total Time to Rescue Survivors

Figure 13A:
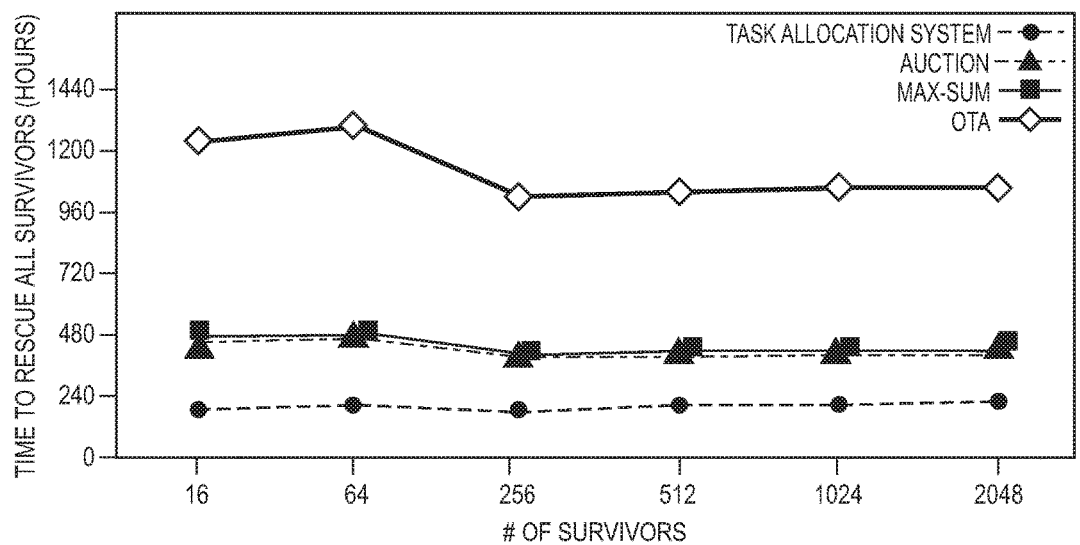
FIGS. 13A, 13B, 13C, and 13D illustrate performance of the example task allocation system when compared to benchmark algorithms, in terms of the total rescue time, according to example embodiments.
Figure 13B:
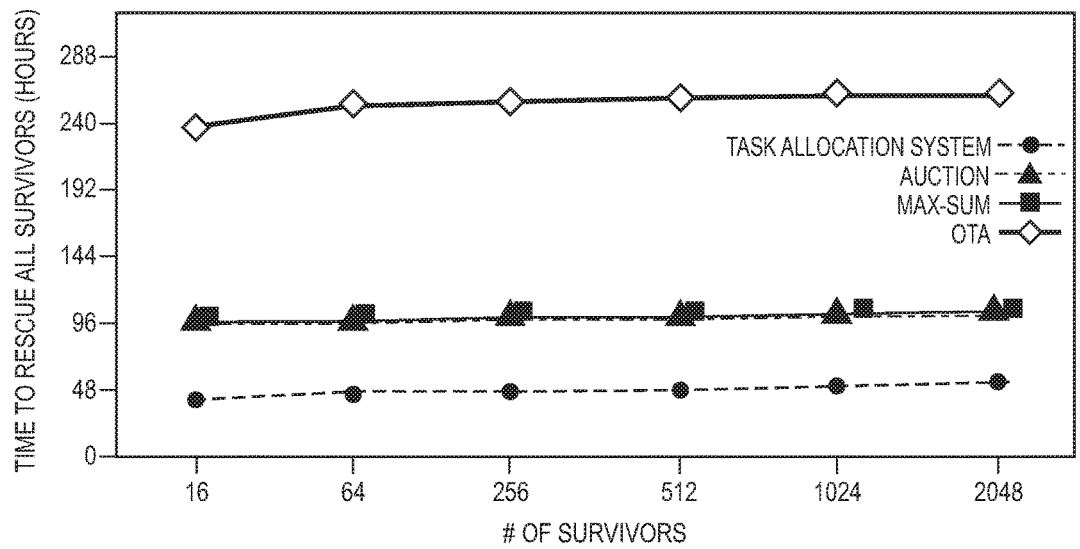
Figure 13C:
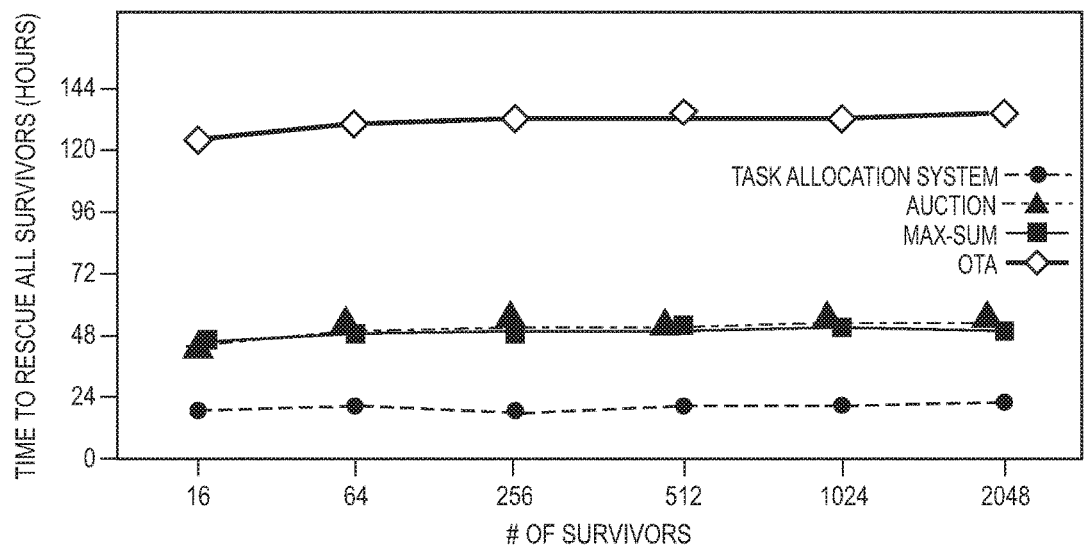
Figure 13D:
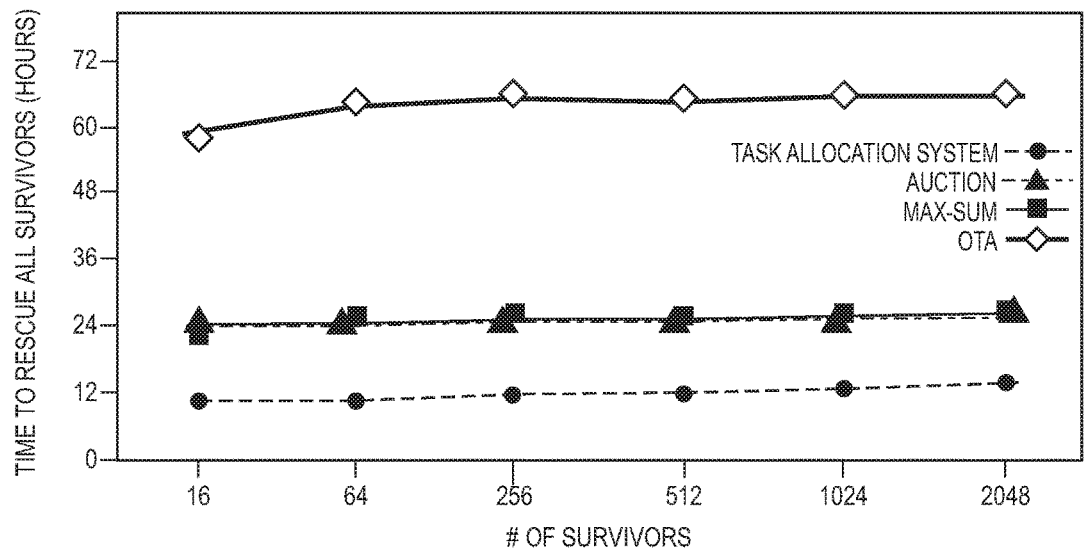
Figure 14A:
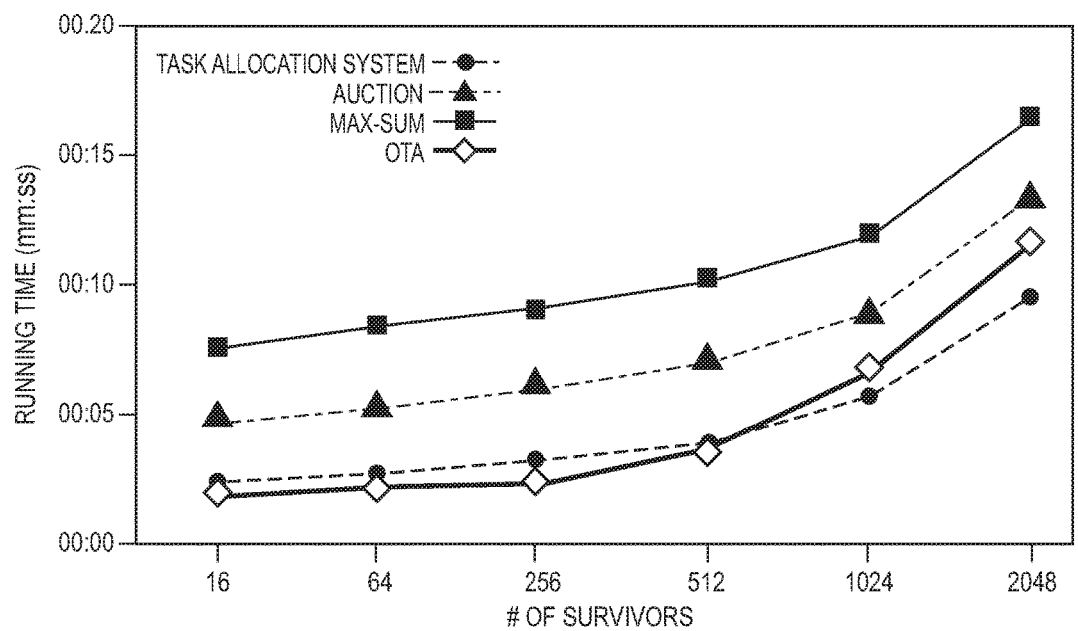
FIG. 14A illustrates the task allocation system runtime performance versus number of UAVs, according to an example embodiment.
Figure 14B:
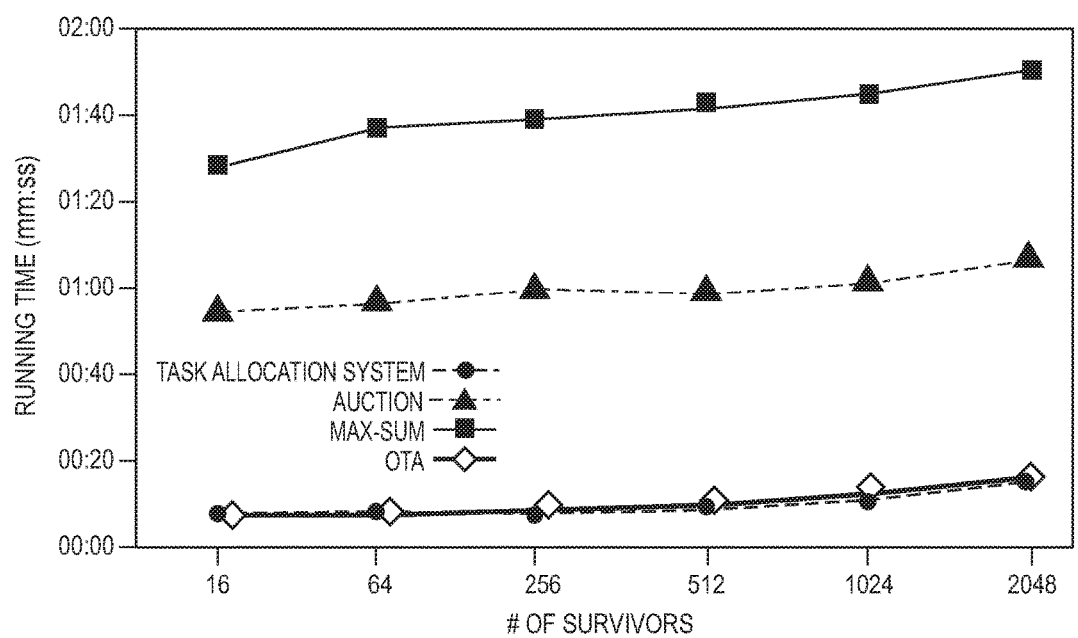
FIG. 14B illustrates the OTA benchmark runtime performance versus number of UAVs, according to an example embodiment.
Figure 14C:
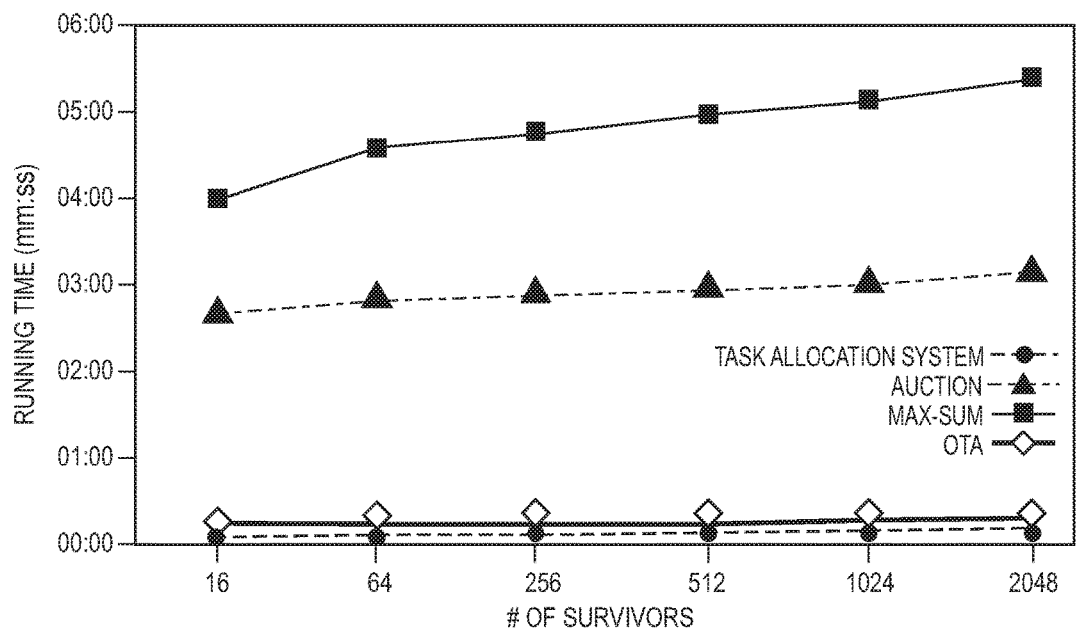
FIG. 14C illustrates the auction benchmark runtime performance versus number of UAVs, according to an example embodiment.
Figure 14D:
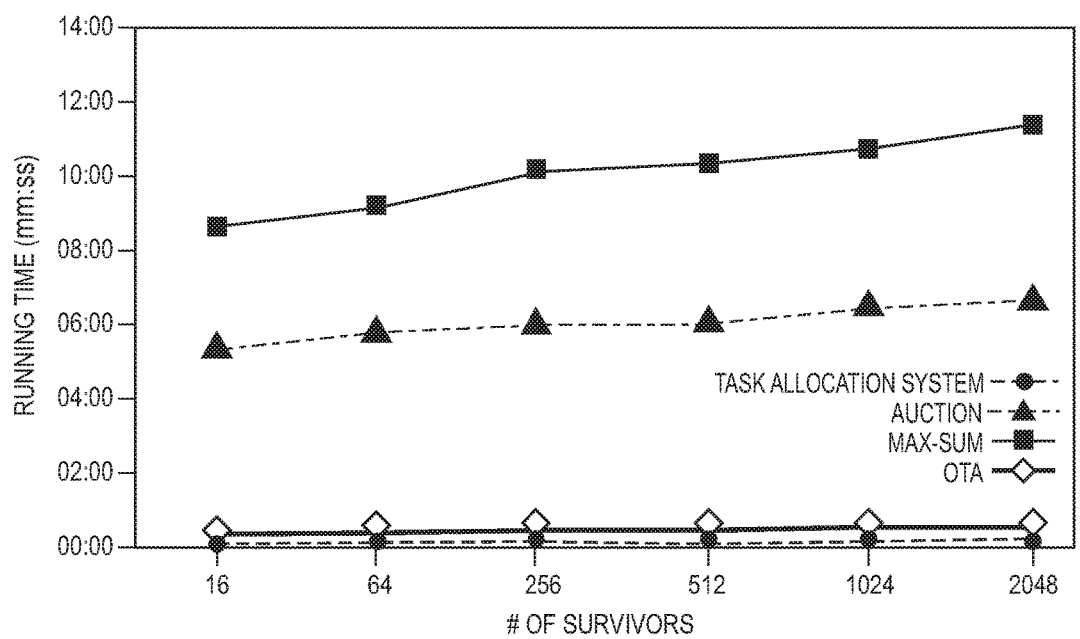
FIG. 14D illustrates the max-sum benchmark runtime performance versus number of UAVs, according to an example embodiment.

The total time required to rescue all survivors is defined as the time interval from when the simulation starts and all survivors are initialized, to the successful rescue of every single survivor in the simulation. This would be impossible to accomplish for most, if not all, algorithms if the survivors were implemented with a limited lifespan and so, for this performance metric, the simulation was programmed such that survivors no longer existed for only a defined period of time (that is, survivors had unlimited lifespan). In addition, the simulation may continue to run past the 72-hour window previously defined. For this performance metric, the simulation only terminated once all survivors had been rescued, at which point the number of time steps taken in the simulation was recorded. The total time to rescue all survivors with varied number of UAVs is depicted in FIGS. 13A-13D. FIG. 13A illustrates the total rescue time with 4 searcher UAVs. FIG. 13B illustrates the total rescue time with 16 searcher UAVs. FIG. 13C illustrates the total rescue time with 32 searcher UAVs. FIG. 13D illustrates the total rescue time with 64 searcher UAVs. The results of the opportunistic task allocation algorithm is represented by the abbreviation OTA.

FIGS. 13A-13D illustrate at least two points. The first is the number of survivors in the simulation has little to no effect on this particular performance metric for the Auction-based coordination, Max-Sum coordination and the task allocation system.

In previous simulations, some survivors were more likely to never be found due to a combination of two reasons: their randomly assigned lifespan was too short, and they were far too isolated from the rest of the survivors. However, in this particular scenario where survivor lifespans are infinite, these 'outlier' survivors are still difficult to locate. In order to find and rescue every single survivor, the UAVs needed to explore a majority of the search blocks to find even the outlier survivors. Given the fact that the quantity of blocks to be searched greatly outnumbers the number of survivors in all simulations by at least fifty to one, the time required to rescue all survivors is roughly equivalent to the time required to search the entire grid. Therefore this performance metric merely serves as a way to quantify the efficiency of each search strategy type.

The second point is that the task allocation system consistently rescues all of the survivors in about half of the time it takes for the auction-based coordination and the max-sum coordination UAVs to complete all of their rescue tasks due to the task allocation system's search strategy which efficiently searches as many regions as possible, thereby increasing the likelihood of detecting a hotspot of survivors.

Lastly, as expected, the Opportunistic Task Allocation (OTA) algorithm performs poorly, since it does not coordinate at all when it comes to searching for or rescuing the survivors. The OTA UAVs therefore make various unnecessary long trips to rescue and search for survivors that could have been assigned to a different nearby UAV.

Runtime Performance

To better measure the computational complexity of the task allocation system, the runtime of each simulation was also recorded. Since this performance metric is hardware-dependent, it only serves to compare whether the task allocation system complexity is less than the benchmarks and how the algorithm's running times are affected by varying survivor and UAV numbers.

The run time performance for all algorithms in scenarios of 4, 16, 32 and 64 UAVs are depicted in FIGS. 14A, 14B, 14C and 14D respectively. It should be noted that the scale for the horizontal axis is almost logarithmic, resulting in a lin-log plot.

From an inspection of the plotted data in FIGS. 14A-14D, for small numbers of UAVs, all the algorithms, including the task allocation system, are of linear order with respect to the number of survivors. This linear trend manifests itself as an exponential-like behavior on the lin-log plots. For larger numbers of survivors, the behavior is logarithmic-like. On a lin-log plot, this results in the data appearing linear. This logarithmic correlation occurs with a finite search space, and when, for large numbers of UAVs and large numbers of survivors, the UAVs are exploring the vast majority search space. The search space size at that point determines the run-time of the simulations, and therefore becomes constant even as the number of survivors increases exponentially.

However, the task allocation system UAVs also scale approximately linearly with the number of UAVs being used, whereas auction-based coordination and max-sum coordination UAV types both scale exponentially with respect to that parameter. This can be more easily distinguished by plotting the run-time of a particular algorithm against the number of UAVs being used, as illustrated in FIGS. 15A-15D. It should be noted that the plots in FIGS. 15A-15D are not lin-log plots.

Figure 15A:
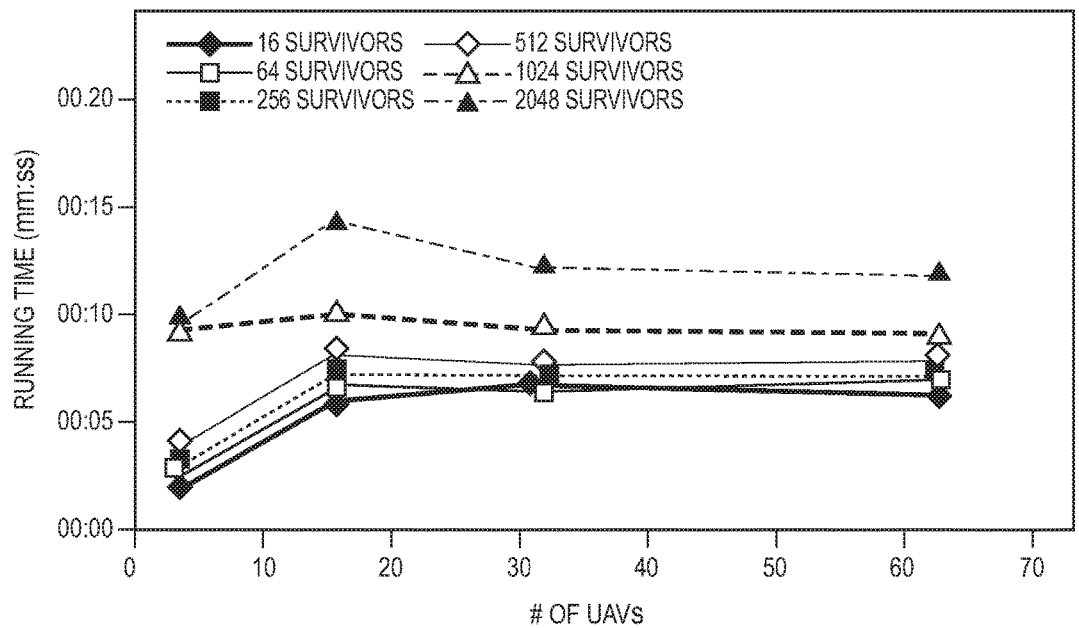
FIG. 15A illustrates the task allocation system runtime performance versus number of UAVs, according to an example embodiment.
Figure 15B:
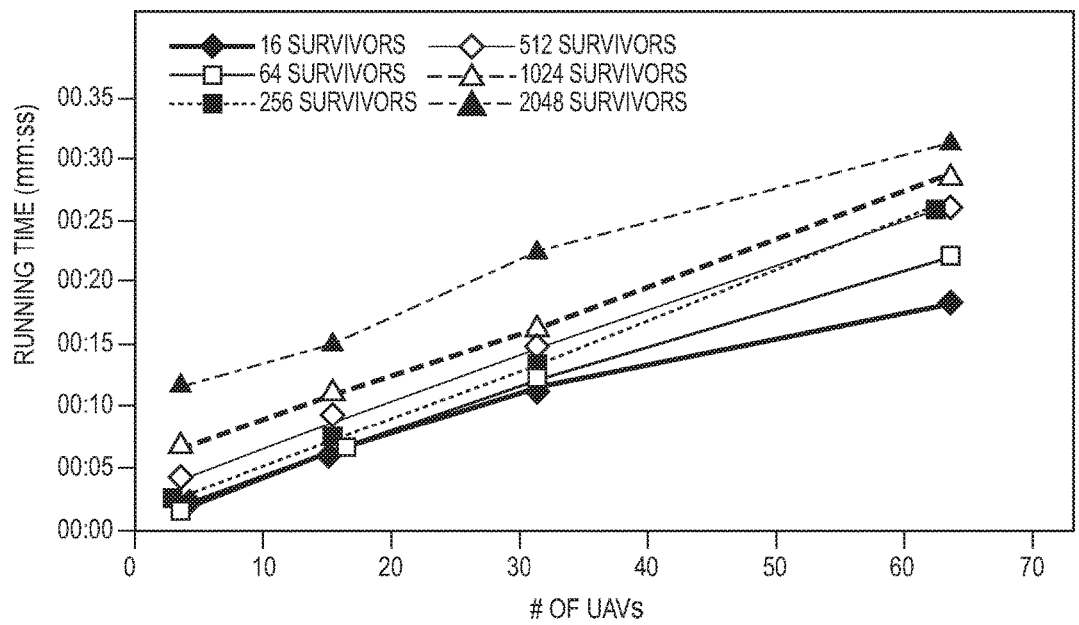
FIG. 15B illustrates the OTA benchmark runtime performance versus number of UAVs, according to an example embodiment.
Figure 15C:
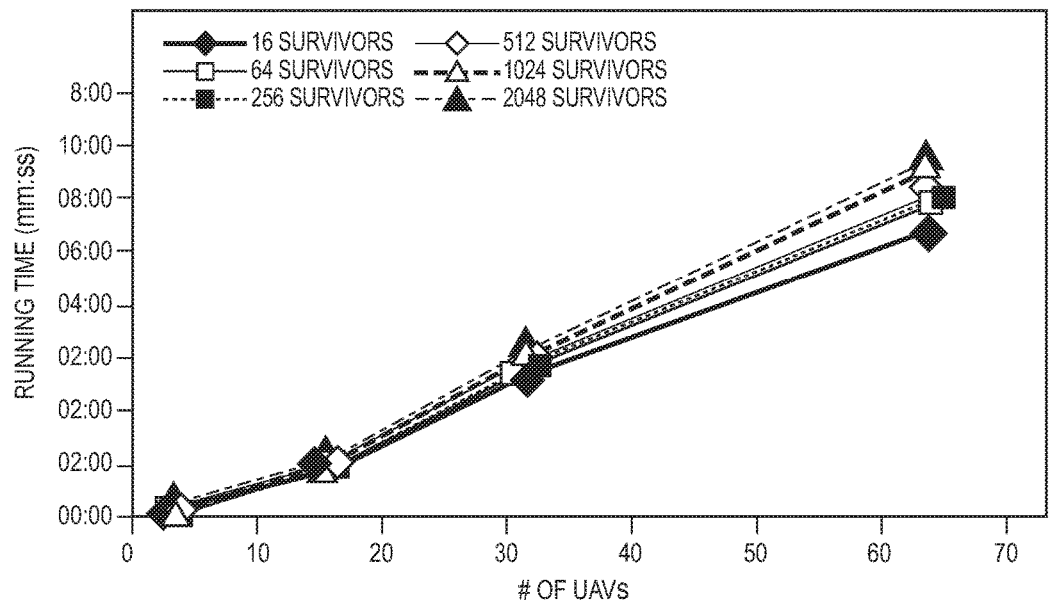
FIG. 15C illustrates the auction benchmark runtime performance versus number of UAVs, according to an example embodiment.
Figure 15D:
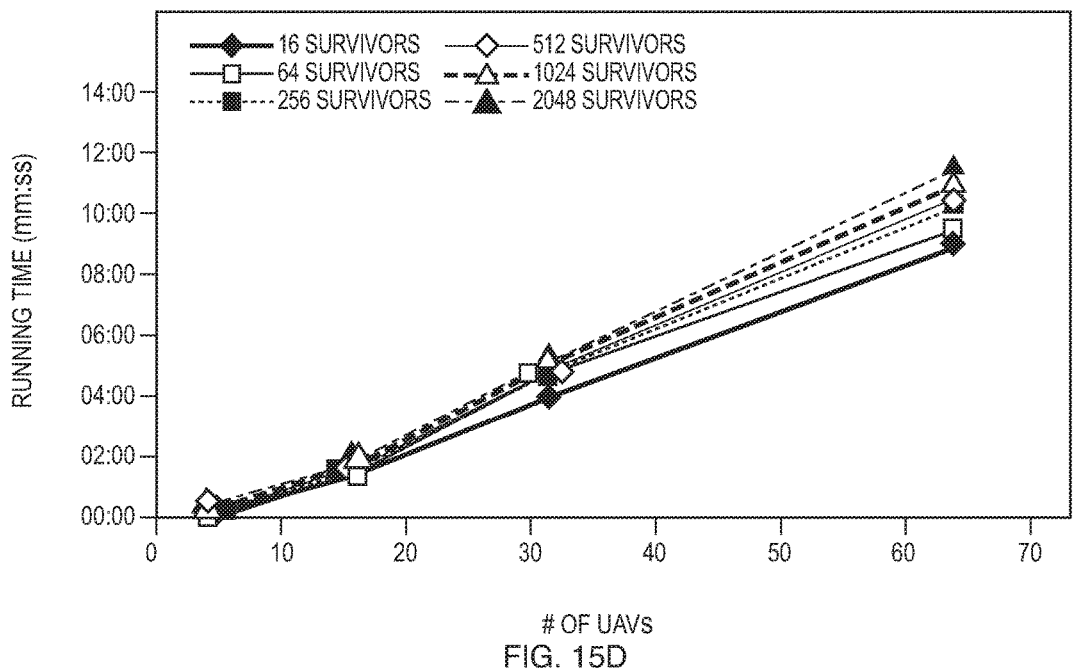
FIG. 15D illustrates the max-sum benchmark runtime performance versus number of UAVs, according to an example embodiment.

FIG. 15A illustrates the task allocation system runtime performance versus number of UAVs. FIG. 15B illustrates the OTA runtime performance versus number of UAVs. FIG. 15C illustrates auction runtime performance versus. number of UAVs. FIG. 15D illustrates max-sum runtime performance versus. number of UAVs.

FIGS. 15A-15D make it easier to distinguish a logarithmic correlation between the running time of the task allocation system simulations and the number of UAVs being simulated from FIG. 15A. The task allocation system works around the concept of relying on UAVs being far more autonomous and doesn't rely on auction-based coordination to determine what action to take next. Consequently, the other benchmarks, which do not rely on individual UAV autonomy, show linear-like correlations between running time and the UAV fleet size.

Since these simulations were all run on the same hardware, it is noteworthy to consider the drastic difference in running times between auction-based benchmarks and the task allocation system described herein. FIGS. 15A-15D demonstrate that auction benchmark simulations ran for at least twice as long as the task allocation system simulations. These figures also demonstrate that max-sum benchmarks were even worse, with simulation run-times climbing at least three times higher than the task allocation system simulation run-times, even for simulations with small UAV fleets.

When multiple UAVs are deployed on the same mission and are to operate autonomously without direct user control, the tasks to be performed during the mission must be properly allocated among the UAVs. The task allocation system described herein approaches this problem relying on computationally simple parameters that are measured locally at each UAV. The objective is to give each UAV the ability to make independent task allocation decisions to ensure autonomous control, efficient run-time, and an economic communication scheme.

The simulation results illustrate that using the task allocation system described herein in an example embodiment of Search and Rescue missions considerably increases the percentage of rescued survivors and shortens the mean rescue time under different scales of fleet size and numbers of survivors. The results also demonstrate better scalability and sustainability when compared to other benchmark algorithms. It should be appreciated that although the task allocation system was evaluated in Search and Rescue mission scenarios, it is not by any means limited to it. The task allocation system described herein can also be applied in other missions that involve dynamic allocation of at least two groups of tasks in a multi-device system such as missions involving surveying and treating livestock, missions for searching and monitoring for goods and items in factories and warehouses, and other missions.

The above description has been presented to enable a person skilled in the art to create and use a system configuration and related method and article of manufacture to dynamically adjust task allocation for a UAV during a multi-UAV mission without communication to a ground control station. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A system for dynamically adjusting task allocation for an unmanned aerial vehicle (UAV) during a multi-UAV mission without communication to a ground control station, the system comprising:
    a plurality of UAVs to execute tasks, each of the plurality of UAVs having a processor and a communication interface; and
    a communication UAV having a processor, a communication interface, and a memory storing a geographic layout representation of a mission environment, each of the plurality of UAVs configured to separately communicate with the communication UAV to receive a status of the mission;
    wherein each of the plurality of UAVs is further configured to:
        receive initial values for system variables based on mission parameters for the multi-UAV mission and a first and second criteria associated with a task allocation for that individual UAV of the plurality of UAVs;
        autonomously determine a first task to be executed by the individual UAV of the plurality of UAVs based on an initial comparison of the first criteria and a value related to a mission parameter or a physical characteristic of the individual UAV of the plurality of UAVs;
        execute the respectively determined first task;
        monitor the value related to the mission parameter or the physical characteristic of the individual UAV, the monitoring occurring within the individual UAV;
        compare the value related to the mission parameter or the physical characteristic with the first criteria, the comparing occurring within the individual UAV;
        detect, in the individual UAV, based on the comparing, that the first criteria is satisfied;
        autonomously determine for the individual UAV, a second task to be executed by the individual UAV based on satisfaction of the first criteria, the second task different from the first task; and
        execute with the individual UAV the determined second task.

2. The system of claim 1, wherein the physical characteristic of the individual UAV of the plurality of UAVs is at least one of a power level, a battery level, and a fuel level.

3. The system of claim 1, wherein the value related to a mission parameter is one of an elapsed mission time or a size of a region explored.

4. The system of claim 1, wherein the initial values of the system variables include one or more of a crowd tolerance indicating an acceptable distance between two or more UAVs of the plurality of UAVs, a speed of the individual UAV of the plurality of UAVs, a distance from the ground at which the individual UAV of the plurality of UAVs is to operate, and a search block size.

5. The system of claim 1, wherein each of the plurality of UAVs separately communicates with the communication UAV to receive a status of the mission and to receive information stored in a memory of the communication UAV, the information representing a virtual representation of an environment for the multi-UAV mission.

6. A method for dynamically adjusting task allocation for an unmanned aerial vehicle (UAV) during a multi-UAV mission without communication to a ground control station, the method comprising:
    receiving at each of a plurality of UAVs in the multi-UAV mission, initial values for system variables based on mission parameters for the multi-UAV mission and a first and second criteria associated with a task allocation for that individual UAV of the plurality of UAVs, each of the plurality of UAVs including a processor and communication interface;
    autonomously determining, respectively within each of the plurality of UAVs, a first task to be executed by the individual UAV of the plurality of UAVs based on an initial comparison of the first criteria and a value related to a mission parameter or a physical characteristic of the individual UAV of the plurality of UAVs;
    executing, with the individual UAV, the respectively determined first task;
    monitoring the value related to the mission parameter or the physical characteristic of the individual UAV of the plurality of UAVs, the monitoring occurring within the individual UAV;
    comparing the value related to the mission parameter or the physical characteristic with the first criteria, the comparing occurring within the individual UAV;
    detecting, in the individual UAV, based on the comparing, that the first criteria is satisfied;
    autonomously determining for the individual UAV, a second task to be executed by the individual UAV based on satisfaction of the first criteria, the second task different from the first task; and
    executing with the individual UAV the determined second task.

7. The method of claim 6, further comprising:
    comparing, the value related to the mission parameter or the physical characteristic with the second criteria; and
    detecting in the individual UAV, based on the comparing, that the second criteria is satisfied;
    determining a third task to be executed by the individual UAV based on satisfaction of the second criteria, the third task different from the first and second tasks; and
    executing with the individual UAV the determined third task.

8. The method of claim 6, wherein the physical characteristic of the individual UAV of the plurality of UAVs is at least one of a power level, a battery level, and a fuel level.

9. The method of claim 6, wherein the physical characteristic of the individual UAV of the plurality of UAVs indicates an operating stamina of the individual UAV of the plurality of UAVs.

10. The method of claim 6, wherein the value related to a mission parameter is one of an elapsed mission time or a size of a region explored.

11. The method of claim 6, wherein the initial values of the system variables include one or more of a crowd tolerance indicating an acceptable distance between two or more UAVs of the plurality of UAVs, a speed of the individual UAV of the plurality of UAVs, a distance from the ground at which the individual UAV of the plurality of UAVs is to operate, and a search block size.

12. The method of claim 11, wherein determining the second task for the individual UAV comprises adjusting, by the individual UAV, one or more of the initial system variables based on the second task.

13. The method of claim 6, wherein each of the plurality of UAVs separately communicates with a communication UAV to receive a status of the mission and to receive information stored in a memory of the communication UAV, the information representing a virtual representation of an environment for the multi-UAV mission.

14. The method of claim 13, wherein the multi-UAV mission is a Search and Rescue mission and the environment includes regions to search and rescue human survivors, each region including at least two blocks, the status of mission indicating whether particular regions or blocks have been explored.

15. The method of claim 14, wherein the first task is to perform a search of an unexplored block.

16. The method of claim 13, wherein the multi-UAV mission is a Survey and Treat mission, and the environment includes regions in which to survey and treat livestock or crops, each region including at least two blocks, the status of the mission indicating whether particular regions or blocks have been surveyed.

17. The method of claim 13, wherein the multi-UAV mission is an Inspection mission, and the environment includes regions in which to inspect equipment or machinery, each region including at least two blocks, the status of the mission indicating whether particular regions or blocks have been inspected.

18. The method of claim 13, wherein the multi-UAV mission is a Monitoring mission, and the environment includes regions in which to monitor physical objects, each region including at least two blocks, the status of the mission indicating whether particular regions or blocks have been monitored.

19. A non-transitory computer readable medium storing instructions executable by a processing device, the instructions implementing a method for dynamically adjusting task allocation for an unmanned aerial vehicle (UAV) during a multi-UAV mission without communication to a ground control station, execution of the instructions causing a plurality of UAVs to:
receive at each of the plurality of UAVs in the multi-UAV mission, initial values for system variables based on mission parameters for the multi-UAV mission and a first and second criteria associated with a task allocation for that individual UAV of the plurality of UAVs;
autonomously determine, respectively within each of the plurality of UAVs, a first task to be executed by the individual UAV of the plurality of UAVs based on an initial comparison of the first criteria and a value related to a mission parameter or a physical characteristic of the individual UAV of the plurality of UAVs;
execute, with the individual UAV, the respectively determined first task;
monitor the value related to the mission parameter or the physical characteristic of the individual UAV of the plurality of UAVs, the monitoring occurring within the individual UAV;
compare the value related to the mission parameter or the physical characteristic with the first criteria, the comparing occurring within the individual UAV;
detect, in the individual UAV, based on the comparing, that the first criteria is satisfied;
autonomously determine for the individual UAV, a second task to be executed by the individual UAV based on satisfaction of the first criteria, the second task different from the first task; and
execute with the individual UAV the determined second task.

20. The medium of claim 19, wherein the physical characteristic of the individual UAV of the plurality of UAVs is at least one of a power level, a battery level, and a fuel level.

21. The medium of claim 19, wherein the value related to a mission parameter is one of an elapsed mission time or a size of a region explored.

22. The medium for claim 19, wherein the initial values of the system variables include one or more of a crowd tolerance indicating an acceptable distance between two or more UAVs of the plurality of UAVs, a speed of the individual UAV of the plurality of UAVs, a distance from the ground at which the individual UAV of the plurality of UAVs is to operate and a search block size.

23. The medium for claim 19, wherein each of the plurality of UAVs separately communicates with a communication UAV to receive a status of the mission and to receive information stored in a memory of the communication UAV, the information representing a virtual representation of an environment for the multi-UAV mission.

24. A method for dynamically adjusting task allocation for an unmanned aerial vehicle (UAV) during a multi-UAV mission without communication to a ground control station, the method comprising:
receiving at each of a plurality of UAVs in the multi-UAV mission, initial values for system variables based on mission parameters for the multi-UAV mission and a first and second criteria associated with a task allocation for that individual UAV, each of the plurality of UAVs including a processor and communication interface;
autonomously determining, respectively within each of the plurality of UAVs, a first task to be executed by the individual UAV of the plurality of UAVs based on an initial comparison of the first criteria and a power level of the individual UAV of the plurality of UAVs;
executing, with the individual UAV, the respectively determined first task;
monitoring the power level of the individual UAV of the plurality of UAVs, the monitoring occurring within the individual UAV;
comparing the power level of the individual UAV of the plurality of UAVs with the first criteria, the comparing occurring within the individual UAV;
detecting, in the individual UAV, based on the comparing, that the first criteria is satisfied;
autonomously determining for the individual UAV, a second task to be executed by the individual UAV based on satisfaction of the first criteria, the second task different from the first task; and executing with the individual UAV the determined second task.

25. A method for dynamically adjusting task allocation for an unmanned vehicle (UV) during a multi-UV mission without communication to a ground control station, the method comprising:

receiving at each of a plurality of UVs in the multi-UV mission, initial values for system variables based on mission parameters for the multi-UV mission and a first and second criteria associated with a task allocation for that individual UV of the plurality of UVs, each of the plurality of UVs including a processor and communication interface;

autonomously determining, respectively within each of the plurality of UVs, a first task to be executed by the individual UV of the plurality of UVs based on an initial comparison of the first criteria and a value related to a mission parameter or a physical characteristic of the individual UV of the plurality of UVs;

executing, with the individual UV, the respectively determined first task;

monitoring the value related to the mission parameter or the physical characteristic of the individual UV of the plurality of UVs, the monitoring occurring within the individual UV;

comparing the value related to the mission parameter or the physical characteristic with the first criteria, the comparing occurring within the individual UV;

detecting, in the individual UV, based on the comparing, that the first criteria is satisfied;

autonomously determining for the individual UV, a second task to be executed by the individual UV based on satisfaction of the first criteria, the second task different from the first task; and executing with the individual UV the determined second task.

26. The method of claim 25, wherein the individual UV of the plurality of UVs is operable in one or more of: on ground, in water or under water.

* * * * *

UNITED STATES PATENT AND TRADEMARK OFFICE
CERTIFICATE OF CORRECTION

PATENT NO. : 10,203,701 B2
APPLICATION NO. : 15/344014
DATED : February 12, 2019
INVENTOR(S) : Heba Abdullatif Kurdi et al.

It is certified that error appears in the above-identified patent and that said Letters Patent is hereby corrected as shown below:

In the Specification

At Column 27, Line 25, please insert a new paragraph as follows:
-- Inventor Heba Abdullatif Kurdi is an associate professor at Computer Science Department, King Saud University, Riyadh, Saudi Arabia. --

Signed and Sealed this
First Day of October, 2019

Andrei Iancu
*Director of the United States Patent and Trademark Office*